(12) United States Patent
Lin et al.

(10) Patent No.: US 12,368,613 B1
(45) Date of Patent: Jul. 22, 2025

(54) AVOIDING TRAFFIC FLOODING FOR KNOWN UNICAST TRAFFIC WHEN AN EVPN IS INTER-CONNECTED TO A DATA PLANE VXLAN IN ALL-ACTIVE MODE

(71) Applicant: Juniper Networks, Inc., Sunnyvale, CA (US)

(72) Inventors: Wen Lin, Andover, MA (US); Vrishabha Sikand, Lexington, MA (US); Kranthi Kumar Katam, San Jose, CA (US); Selvakumar Sivaraj, Sunnyvale, CA (US); Moo Jin Jeong, San Jose, CA (US); Jagadish N. Grandhi, Telangana (IN); Pratibha Goel, Karnataka (IN)

(73) Assignee: Juniper Networks, Inc., Sunnyvale, CA (US)

( * ) Notice: Subject to any disclaimer, the term of this patent is extended or adjusted under 35 U.S.C. 154(b) by 408 days.

(21) Appl. No.: 17/893,866

(22) Filed: Aug. 23, 2022

Related U.S. Application Data

(60) Provisional application No. 63/345,822, filed on May 25, 2022.

(51) Int. Cl.
  *H04L 12/46* (2006.01)
  *H04L 45/745* (2022.01)

(52) U.S. Cl.
  CPC ...... *H04L 12/4641* (2013.01); *H04L 12/4633* (2013.01); *H04L 45/745* (2013.01)

(58) Field of Classification Search
  CPC ............. H04L 12/4641; H04L 12/4633; H04L 45/745
  See application file for complete search history.

(56) References Cited

U.S. PATENT DOCUMENTS

| | | | |
|---|---|---|---|
| 10,666,459 B1 * | 5/2020 | Sajassi | H04L 12/4641 |
| 2017/0317919 A1 * | 11/2017 | Fernando | H04L 41/40 |
| 2018/0227135 A1 * | 8/2018 | Drake | H04L 12/1886 |
| 2021/0234727 A1 * | 7/2021 | Ranpise | H04L 63/0272 |

FOREIGN PATENT DOCUMENTS

| | | | | |
|---|---|---|---|---|
| CN | 106998286 A | * | 8/2017 | ......... H04L 12/4633 |

* cited by examiner

*Primary Examiner* — Chae S Lee
(74) *Attorney, Agent, or Firm* — John C. Pokotylo; Pokotylo Patent Services

(57) ABSTRACT

A method for use in a system including an Ethernet Virtual Private Network (EVPN) core network and a VXLAN data plane, a first gateway device GW1 and a second gateway device GW2 operating in an all-active multihoming mode to interconnect the EVPN core network and VXLAN data plane, is described. The method includes establishing, by the second gateway device GW2, a VXLAN tunnel to a remote VTEP X before traffic is sent by the remote VTEP X and received by the second gateway device GW2, but after traffic is sent by the remote VTEP X and received by the first gateway device GW1. wherein the first and second gateway devices GW1 and GW2 use an anycast IP address as a source address for VTEP X.

20 Claims, 18 Drawing Sheets

FIGURE 2A (Prior Art)

| INNER MAC DESTINATION ADDRESS | INNER MAC SOURCE ADDRESS | IEEE 802.1Q (OPTIONAL) | ORIGINAL ETHERNET PAYLOAD | IEEE 802.1Q (OPTIONAL) |

FIGURE 2B (Prior Art)

| OUTER MAC DESTINATION ADDRESS | OUTER MAC SOURCE ADDRESS | OUTER IEEE 802.1Q | OUTER IP SOURCE ADDRESS | OUTER IP DESTINATION ADDRESS | OUTER UDP | VNI (24 BITS) |

FIGURE 2C (Prior Art)

| MPLS OUTER MAC DESTINATION ADDRESS | MPLS OUTER MAC SOURCE ADDRESS | MPLS ETYPE | MPLS TUNNEL LABEL | MPLS EVPN LABEL |

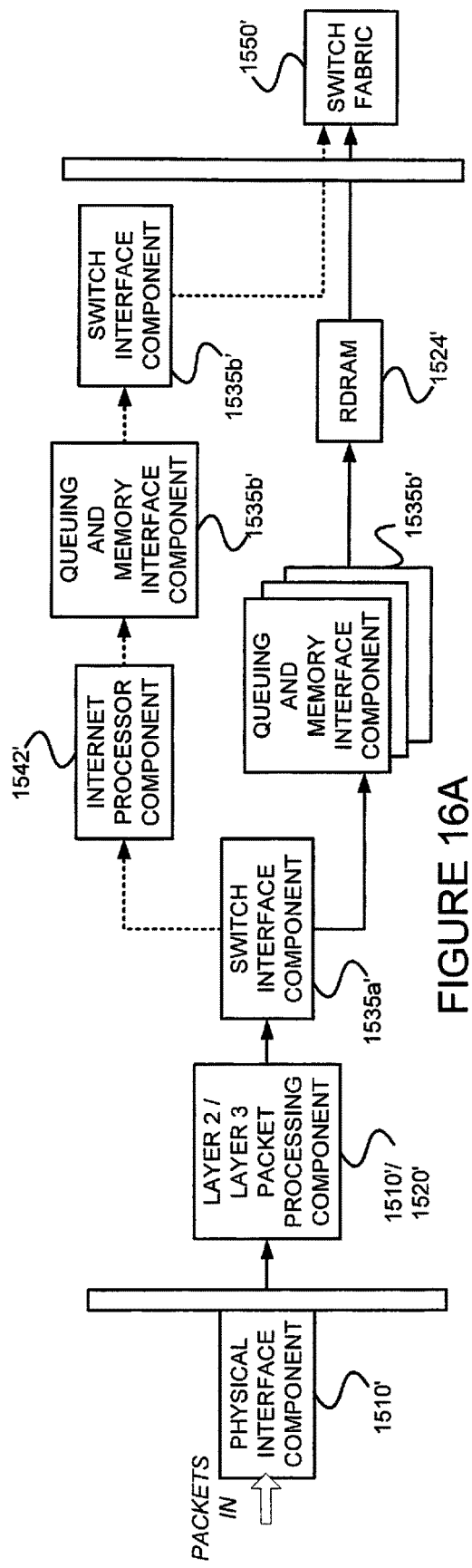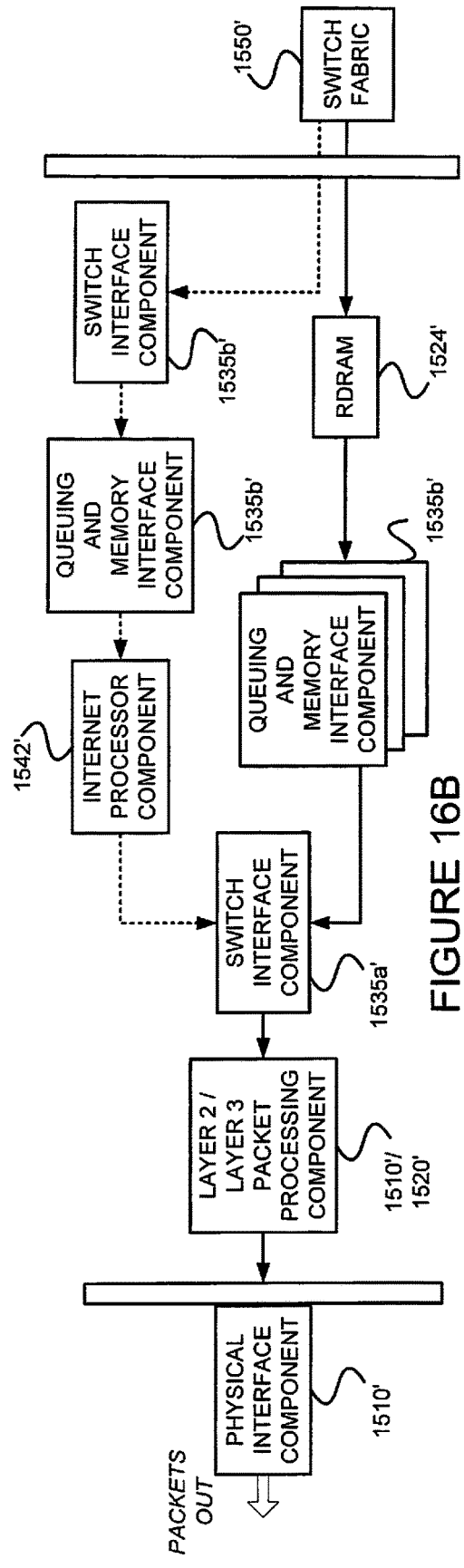

AVOIDING TRAFFIC FLOODING FOR KNOWN UNICAST TRAFFIC WHEN AN EVPN IS INTER-CONNECTED TO A DATA PLANE VXLAN IN ALL-ACTIVE MODE

§ 0. RELATED APPLICATION(S)

This application claims the benefit of U.S. Provisional Application No. 63/345,822 (referred to as "the '822 provisional" and incorporated herein by reference), titled "AVOID TRAFFIC FLOODING FOR KNOWN UNICAST TRAFFIC WHEN EVPN IS INTER-CONNECTED TO DATA PLANE VXLAN IN ALL-ACTIVE MODE," filed on May 25, 2022, and listing Wen Lin, Vrishabha Sikand, Kranthi Kumar Katam, SelvaKumar Sivaraj, Moo Jin Jeong, Jagadish N. Grandhi, and Pratibha Goel as the inventors. The scope of the invention is not limited to any requirements of the specific embodiments in the '822 provisional.

§ 1. BACKGROUND OF THE INVENTION

§ 1.1 Field of the Invention

The present description concerns communications over networks. In particular, the present description concerns reducing the flooding of data packets in certain situations, such as by gateway devices between an Ethernet Virtual Private Network (EVPN) and a Virtual Extensible Local Area Network (VXLAN).

§ 1.2 Background Information

§ 1.2.1 EVPN with VXLAN Data Plane Encapsulation

Ethernet VPNs (EVPNs) enable service providers to connect groups of dispersed customer sites using Layer 2 virtual bridges. Virtual Extensible LANs (VXLANs) allow service providers to stretch Layer 2 connectivity over an intervening Layer 3 network, while providing network segmentation like a VLAN, but without scaling limitations of traditional VLANs.

EVPN with VXLAN encapsulation handles Layer 2 connectivity at the scale required by cloud server providers and may be used to replace limiting protocols like Spanning Tree Protocol (STP), freeing up the Layer 3 network to use more robust routing protocols.

Although they are understood by those skilled in the art, virtual private networks (VPNs), such as EVPNs, VXLANs, and the integration of EVPNs and VXLANs are introduced below.

§ 1.2.1.1 Virtual Private Networks (VPNs)

EVPN is a standards-based technology (See, e.g., A. Sajassi, Ed., "BGP MPLS-Based Ethernet VPN," Request for Comments: 7432 (Internet Engineering Task Force, February 2015), incorporated herein by reference.) that provides virtual multipoint bridged connectivity between different Layer 2 domains over an Internet Protocol (IP) or Internet Protocol/Multiprotocol Label Switching (IP/MPLS) backbone network. Like other VPN technologies, such as IP VPN and virtual private LAN service (VPLS), EVPN instances are configured on provider edge (PE) routers to maintain logical service separation between customers. The PE routers connect to customer edge (CE) devices, which can be routers, switches, hosts, etc. The PE routers then exchange reachability information using Multiprotocol Border Gateway Protocol (MP-BGP). Encapsulated traffic is forwarded between PE routers. The EVPN architecture shares some common elements with other VPN technologies. This makes it easier to seamlessly introduce and integrate an EVPN into existing service environments.

FIG. 1 illustrates an example of a conventional network topology 100 in which an EVPN provides a transport service to customers via customer edge devices CE 1 and CE 2. The example EVPN includes provider edge devices PE 1, PE 2 and PE 3, as well as a border gateway protocol (BGP) route reflector. Control plane learning may occur within the EVPN among the provider edge devices (PEs). Data plane learning may occur between customer edge devices (CEs) and provider edge devices (PEs). CE 1 is said to be multi-homed to the EVPN via PE 1 and PE 2. The two links, which may be part of a link aggregation group (LAG) may be thought of as a common Ethernet segment (ES), which is identified by the Ethernet segment identifier (ESI) 00:11:22:33:44:55:66: 77:88:99. The provider edge devices PE 1, PE 2 and PE 3 belong to the same EVPN instance (EVI).

The EVPN is often used as a Layer 2 overlay solution to provide Layer 2 connection over an IP underlay for the endpoints within a virtual network whenever Layer 2 connectivity is required by an end station such as bare-metal server (BMS). Otherwise, Layer 3 routing is used, for example, through virtual routing and forwarding (VRF) tables. Advantageously, EVPN technology offers multi-tenancy, flexible services that can be extended on demand, frequently using compute resources of different physical data centers for a single service (Layer 2 extension).

EVPN's MP-BGP control plane enables service providers to dynamically move live virtual machines (VMs) from one data center to another (also known as "virtual machine (VM) motion". After a VM is moved to a destination server or "hypervisor" (that is, a program used to run and manage VMs on a computer(s)), it transmits a gratuitous address resolution protocol (ARP), which updates the Layer 2 forwarding table of the PE device at the destination data center. The PE device then transmits a MAC route update (e.g., via a Type 2 advertisement) to all remote PE devices which, in turn, update their forwarding tables. An EVPN tracks the movement of the VM, which is also known as MAC mobility.

EVPN also has mechanisms that detect and stop MAC flapping, and prevent the looping of broadcast, unknown unicast, and multicast (BUM) traffic in an all-active multi-homed topology.

The EVPN technology, similar to Layer 3 multiprotocol label switching (MPLS) VPNs, includes the concept of routing MAC addresses using an IP/MPLS core. EVPN provides benefits, such as, the ability to have an active multihomed edge device, aliasing, fast convergence, load balancing of traffic across dual-active links, MAC address mobility, and multitenancy. In addition, EVPN can use techniques such as multihoming, split horizon, local link bias, and EVPN with VXLAN encapsulation (or tunneling). Each of these techniques is introduced below.

Multihoming is used to provide redundancy in the event that an access link or one of the PE routing devices to which a CE device is connected, fails. In either case, traffic flows from the CE device towards the PE router using one or more remaining active links. For traffic in the other direction, the remote PE router updates its forwarding table to send traffic to the remaining active PE router(s) connected to the multihomed Ethernet segment (ES). EVPN provides a fast convergence mechanism, which reduces traffic restoration time so that the time it takes to make this adjustment is independent of the number of media access control (MAC) addresses learned by the PE router. "All-active" multihoming enables a CE device to connect to two or more PE routers such that traffic may be forwarded using all of the links between the devices. (Recall, for example, CE 1, PE 1 and PE 2 of FIG. 1.) This multihoming enables the CE device to load-balance traffic to multiple PE routers. Further, multihoming enables a remote PE router to load-balance traffic to the multihomed PE routers across the core network. This load balancing of traffic flows between data centers is known as aliasing, which causes different signals to become indistinguishable (that is, they become "aliases" of one another).

Split horizon prevents the looping of BUM traffic in a network. The split horizon basic principle is simple—information about the routing for a particular packet is never sent back in the direction from which it was received.

Local bias conserves bandwidth by using local links to forward unicast traffic exiting a Virtual Chassis or Virtual Chassis Fabric (VCF) that has a link aggregation group (LAG) bundle composed of member links on different member switches in the same Virtual Chassis or VCF. A local link is a member link in the LAG bundle that is on the member switch that received the traffic.

EVPN with VXLAN encapsulation is used for Layer 2 connectivity between virtual machines and a top-of-rack (TOR) switch within a Layer 2 domain. Certain routers can be used as a Layer 2 or Layer 3 VXLAN gateway.

§ 1.2.1.2 Virtual Extensible Local Area Networks (VXLANs)

VXLANs can be used to provide an "overlay" scheme that expands the Layer 2 network address space from about 4,000 to 16 million, largely solving the scaling issues seen in VLAN-based environments. Network overlays are created by encapsulating traffic and tunneling the traffic over a physical network. A number of different tunneling protocols may be used to create network overlays. The most common protocol in the context of data centers is presently VXLAN. VXLAN tunneling protocol encapsulates Layer 2 Ethernet frames (See, e.g., FIG. 2A.) in Layer 3 UDP packets. This encapsulation enables service providers to create virtual Layer 2 subnets or segments that can span physical Layer 3 networks.

In a VXLAN overlay network, a VXLAN network identifier (VNI) uniquely identifies each Layer 2 subnet or segment. A VNI segments traffic the same way that an IEEE 802.1Q VLAN ID segments traffic. As is the case with VLAN, virtual machines on the same VNI can communicate directly with each other, whereas virtual machines on different VNIs need a router to communicate with each other.

The entity that performs the encapsulation and de-encapsulation is called a VXLAN tunnel endpoint (VTEP). In the physical network, a device that functions as a Layer 2 or Layer 3 VXLAN gateway can encapsulate and de-encapsulate data packets. This type of VTEP is known as a "hardware VTEP." In the virtual network, VTEPs can reside in hypervisor hosts, such as kernel-based virtual machine (KVM) hosts. This type of VTEP is known as a "software VTEP."

Each VTEP has two interfaces. A first of the two interfaces is a switching interface that faces the virtual machines in the host and provides communication between VMs on the local LAN segment. A second of the two interfaces is an IP interface that faces the Layer 3 network.

Each VTEP has a unique IP address that is used for routing the UDP packets between VTEPs. For example, when a first VTEP (VTEP1) receives an Ethernet frame (Recall, e.g., FIG. 2A.) from VM1 addressed to VM3, it uses the VNI and the destination MAC to look up in its forwarding table which VTEP (in this example, a second VTEP (VTEP2)) it will send the packet to. It then adds a VXLAN header (See, e.g., FIG. 2B) that contains the VNI to the Ethernet frame, encapsulates the frame in a Layer 3 UDP packet, and routes the packet to VTEP2 over the Layer 3 network. VTEP2 de-encapsulates the original Ethernet frame and forwards it to VM3. VM1 and VM3 cannot detect the VXLAN tunnel and the Layer 3 network between them. That is, the VXLAN tunnel acts as a "transparent" LAN segment. For comparison, FIG. 2C illustrates a packet header in an MPLS network.

§ 1.2.1.3 EVPN-VXLAN Integration Overview

VXLAN defines a tunneling scheme to overlay Layer 2 networks on top of Layer 3 networks. This tunneling scheme allows for optimal forwarding of Ethernet frames with support for multipathing of unicast and multicast traffic with the use of UDP/IP encapsulation for tunneling, and is mainly used for the intra-data center site connectivity.

Referring to the example network topology 300 of FIG. 3, one characteristic of EVP is that MAC address learning between PE routers (PE1-PE4) occurs in the control plane. Responsive to a local PE router detecting a new MAC address from a CE device, it advertises (e.g., using MP-BGP) the address to all the remote PE routers. This method differs from existing Layer 2 VPN solutions such as VPLS, which learn by flooding unknown unicast in the data plane. This control plane MAC learning enables many benefits provided by EVPN. For example, since MAC learning is handled in the control plane, EVPN has the flexibility to support different data plane encapsulation technologies between PE routers. This flexibility is beneficial because not all backbone networks run MPLS, especially in enterprise networks.

EVPN addresses many of the challenges faced by network operators building data centers to offer cloud and virtualization services. The main application of EVPN is Data Center Interconnect (DCI), which refers to the ability to extend Layer 2 connectivity between different data centers that are deployed to improve the performance of delivering application traffic to end users and for disaster recovery. Although various DCI technologies are available, EVPN has advantages (such as active/active redundancy, aliasing, and mass MAC withdrawal) over other MPLS technologies. Consequently, it is useful to integrate VXLAN with EVPN to provide DCI.

As shown in FIG. 3, an EVPN is used as an interconnect to connect a VXLAN at data center site 1 and another VXLAN at data center site 2. Data center site 1 includes a top of rack (TOR) 1 coupled with servers identified by VLAN 1, MAC 1 and VLAN 2, MAC 2. Similarly, data center site 2 includes TOR 2 couple with servers identified by VLAN 1, MAC 11 and VLAN 2, MAC 12. Provider edge devices PE1 and PE2 of the EVPN act as gateways between the EVPN and the VXLAN at data center site 1, while PE3 and PE4 of the EVPN act as gateways between the EVPN and the VXLAN at data center cite 2. A first VXLAN tunnel between TOR 1 and PE2 and between TOR 2 and PE4 is extended by an EVPN tunnel between PE2 and PE4. Similarly, a second VXLAN tunnel between TOR 1 and PE1 and between TOR 2 and PE3 is extended by an EVPN tunnel between PE1 and PE3. Each VXLAN, which is connected to the MPLS or IP core, runs an independent instance of the interior gateway protocol (IGP) control plane. Each PE router participates in the IGP control plane instance of its VXLAN. In this example, each customer is a data center, so each has its own virtual router for VXLAN underlay.

Each PE node can terminate the VXLAN data plane encapsulation where the VXLAN network identifier (VNI) is mapped to a bridge domain or VLAN. The PE router performs data plane learning on the traffic received from the VXLAN.

Each PE node implements EVPN to distribute the client MAC addresses learned over the VXLAN tunnel into BGP. Each PE node encapsulates the VXLAN or Ethernet frames with MPLS when sending the packets over the MPLS core and with the VXLAN tunnel header when sending the packets over the VXLAN network.

§ 1.2.1.3.1 EVPN Type 2 Routes

As noted above, one characteristic of EVPN is that MAC address learning between PE routers occurs in the control plane. For example, Type 2 routes may be used to advertise MAC addresses and IP addresses that might be associated with the MAC addresses. First, a PE learns MAC addresses from any CEs attached directly to it (e.g., via normal data-plane learning mechanisms, although RFC 7432 also allows for MAC address learning via control plane interaction between PE and CE).

FIG. 4 illustrates a data structure 400 in accordance with a Type 2 route format. In the example data structure 400, a route distinguisher field 410, an ESI field 420, an Ethernet TAG ID field 430, a MAC address length field 440 and a MAC address field 450 are provided. An IP Address field 470 is optional and is set to zero by default. This field 470 might be populated if a PE is aware of an IP address associated with a given MAC address. This is used in proxy ARP scenarios in which a remote PE will respond to an ARP request received from a CE attached to that PE. An MPLS Label 1 field 480 is a downstream-assigned Label associated with the MAC address being advertised by a PE. This label is used to forward packets toward the CE.

RFC 7432 specifies four label assignment mechanisms:
Assignment Mechanism Description
 MAC-VRF Single EVPN label for all MAC addresses in a given MAC-VRF
 MAC-VRF, Ethernet tag Unique EVPN label per <MAC-VRF, Ethernet tag> combination
 ESI, Ethernet tag Unique EVPN label per <ESI, Ethernet tag> combination
 MAC Unique EVPN label per MAC address

§ 1.2.1.4 Challenges Arising when Using All-Active Multihoming at Gateway Devices Challenges arising when using all-active multihoming at gateway devices are described with reference to an example environment 500 in FIG. 5. The example environment includes an EVPN core network 510 and a VXLAN data plane network 520. Customer edge devices (CEs) 530 are coupled with one or more provider edge devices (PEs) 540 in the EVPN core 510. The EVPN core 510 includes gateway devices (GWs) 550 coupled with remote VXLAN tunnel endpoints (VTEPs) 560 of VXLAN 520. Note that each of the GWs 550 is a special type of PE 540 in that they provide a gateway between the EVPN 510 and VXLAN 520.

In the example network environment 500, remote VTEP 560a is coupled with host device A 570.

When servers are running hypervisor with virtual machines (VMs) that support RFC 7348 based data plane VXLAN, protocol independent multicast (PIM) is used as an underlay for flooding broadcast, unknown and multicast (BUM) traffic. Unlike EVPN with VXLAN encapsulation, for data plane VXLAN 520, the discovery of VXLAN Tunnel End Point (VTEPs) 560 is data plane driven instead of control plane driven.

When the EVPN 510 is used to interconnect the data plane VXLAN 520, the data plane VXLAN side of the network 500 is treated as the layer 2 access for EVPN 510. To provide redundancy and fault tolerance, normally a redundant set of gateways (GWs) 550 are used. Each GW 550 sits at the border of the EVPN 510 and the VXLAN data plane 520. Each GW 550 runs EVPN to other EVPN PEs 540 in the EVPN 510, and also runs data plane VXLAN to each remote VTEP 560 hosting on the VMs, compute node, or virtual switch. This application may refer to that remote VTEP 560 hosting on the VM, compute node, or virtual switch as the SW-VTEP.

To achieve fast convergence, "all-active" multihoming is desirable for the GWs 550. Unfortunately, however, a problem may arise when all-active multihoming on GWs 550 is used in such a use case. As shown in FIG. 5, GW1 550a and GW2 550b are working in all-active multihoming mode to inter-connect the EVPN network 510 with the VXLAN network 520 that uses the data plane VXLAN.

§ 1.2.1.4.1 Establishment of a Data Plane VXLAN Tunnel

On each GW 550, the establishment of a data plane VXLAN tunnel to a remote SW-VTEP 560 is data-driven. A GW 550 establishes a VXLAN tunnel to a remote SW-VTEP 560 only after the GW 550 detects the source VTEP 560 from a data packet sent by that remote SW-VTEP. Note that the data plane traffic can be either a uni-destination or multi-destination in nature. From the perspective of the EVPN 510, the established data plane VXLAN tunnel is treated as a layer 2 access interface for the EVPN.

The EVPN GWs 550 perform data plane learning of the source MAC address for traffic received from its access. As already noted above, to achieve redundancy and fast convergence, the GWs 550 operate in all-active mode. All data plane VXLANs (in this example, VXLAN 520) are treated as a network connected to the EVPN 510 in all-active mode. As a result, each MAC address learned from its data plane VXLAN tunnel is associated with a multihomed Ethernet Segment Identifier (ESI) and is considered to be reachable through that multihomed ES by all the GWs (in this case, both GW1 and GW2) 550 in that redundant set.

§ 1.2.1.4.2 Anycast VTEP Address on GWS

A remote VTEP 560 on a server performs data plane learning of the MAC address of the CE(s) 530. For example, if a data packet sent by CE1 530a is delivered to the VTEP 560 by GW1 550a, then the remote VTEP 560 learns that CE1's MAC is behind GW1 550a. (That is, CE1's MAC is behind GW1's VTEP.) When GWs 550 are working in all-active multihoming mode, to avoid MAC flip-flop between GW1 and GW2 at a remote SW-VTEP 560, an anycast address is used as the source address for the redundant set of the GWs 550. (The Anycast address is used by both GW1 550a and GW2 550b, as the source VTEP IP address for both GW1 and GW2. So regardless which GW 550 delivers CE1's data packet to the VTEP 560 source, the VTEP 560 learns the CE1's MAC through the same GW's VTEP address; namely, the Anycast address.) That is, both GW1 and GW2 share an anycast IP address (but still have unique loopback IP addresses). Consequently, to a remote SW-VTEP 560, the same MAC address is always learned from the same Anycast IP address regardless which VXLAN tunnel the packet traverses from EVPN network 510 to that remote VTEP 560.

§ 1.2.1.4.3 Traffic Black Holing with Data Plane Driven VXLAN Tunnel

Still referring to FIG. 5, assume, for example, that CE1 530a attached to a EVPN PE1 540a wants to send a packet to a host (referred to as "host device A" or "host A") 570 behind a remote SW-VTEP (referred to as "VTEP X") 560a. Initially, CE1 530a has no address resolution protocol (ARP) entry for the host A 570. Therefore, CE1 530a first sends an ARP request for host A. Assuming that host A 570 is a silent host or that host A's MAC address has already been aged out on EVPN PE1, the ARP request packet from CE1 530a for host A's MAC is flooded by PE1 540a to both GW1 and GW2 550. After the designated forwarder (DF) GW floods the ARP packet to its access, and all remote VTEPs 560 on the right in FIG. 5 learn CE1's MAC address.

When a unicast ARP reply comes back from host A 570, the remote VTEP X 560a that the host A 570 is attached to unicasts the ARP reply. Due to the anycast VTEP address used by both GW1 550a and GW2 550b, the ARP reply is received by one of the GWs 550. (In this example, let us assume that the unicast ARP reply is received by GW1 550a.) GW1 550a learns the MAC/IP addresses of host A 570 through the data plane and establishes a data plane VXLAN tunnel to the remote VTEP X 560a. GW1 550a updates its forwarding entry for host A's MAC/IP address(es). In the forwarding entry, the host A's MAC address is associated with the data plane VXLAN tunnel created for the remote VTEP X 560a. This information is also kept in the control plane on GW1 550a. (Note that some implementations may create a remote VTEP interface, but other implementations may create a tunnel next-hop or some other entity to represent a VXLAN tunnel.)

Per regular EVPN procedure, GW1 550a advertises (e.g., via a Type 2 advertisement) host A's MAC/IP addresses and its associated Ethernet Segment Identifier (ESI) to the rest of the EVPN PEs 540. Other remote EVPN PEs 540 not attached to that ESI update their forwarding entries for the host A's MAC/IP address(es), and the host A 570 is considered to be reachable by both GW1 550a and GW2 550b. Per regular EVPN procedure, traffic to host A 570 will be load balanced between GW1 550a and GW2 550b.

Further assume that up to the point when the unicast ARP reply from the host A was forwarded by the remote VTEP X 560a, GW2 550b has never received any data packet from the remote VTEP X 560a. Therefore, from the perspective of GW2 550b, there is no established data plane VXLAN tunnel to the remote VTEP X 560a (even though the other PEs 540 think they can reach VTEP X 560a via GW2 550b). Hence GW2 550b will not update the forwarding entry for the MAC address of host A 570 learned through the control plane.

Meanwhile, when CE1 530a receives the ARP reply from the host A 570, it starts to send data packets to host A 570. By then, since all EVPN PEs 540 have learned the MAC address of host A 570, these data packets are treated as known unicast packets by any and all PEs 540 of the EVPN 510. In this example, PE1 may load balance the unicast packet to GW2 550b. Unfortunately, however, since GW2 550b will not have updated the forwarding entry for the MAC address of host A 570 learned through the control plane as discussed above, GW2 550b cannot unicast the traffic to host A 570 (because there is no forwarding entry for the MAC address of host A 570). Consequently, GW2 550b will flood (via all connected remote VTEPs 560) the traffic to host A 570. This flooding continues until GW2 550b receives traffic from host A and populates a forwarding entry for the MAC address of host A.

Example embodiments consistent with the present description provide a number of innovative solutions to avoid such flooding. A potential problem of "blackholing" is also avoided. For example, remote PE1 or PE2 sends known unicast traffic to host A 570. Traffic is load balanced to GW 550b. If GW2 550b is the designated forwarder (DF) for the ESI for the VXLAN network 520, GW2 550b floods the packet through a PIM underlay to all remote SW VTEPs 560. In this case, the packet will reach the remote VTEP 560a that host A 570 is attached to. If GW2 550b is non-DF, then it will drop the packet. In this case, traffic from CE1 530a to host A 570 is blocked at the GW2 550b. That is, the data traffic is "blackholed."

§ 2. SUMMARY OF THE INVENTION

One or more of the foregoing problems may be addressed by providing a method (or device or computer-readable medium implementing the method) for use in a system including an Ethernet Virtual Private Network (EVPN) core network and a VXLAN data plane, a first gateway device GW1 and a second gateway device GW2 operating in an all-active multihoming mode to interconnect the EVPN core network and VXLAN data plane. The method includes establishing, by the second gateway device GW2, a VXLAN tunnel to a remote VTEP X before traffic is sent by the remote VTEP X and received by the second gateway device GW2, but after traffic is sent by the remote VTEP X and received by the first gateway device GW1, wherein the first and second gateway devices GW1 and GW2 use an anycast IP address as a source address for VTEP X.

In some example implementations, the act of establishing, by the second gateway device GW2, a VXLAN tunnel to the remote VTEP X before traffic is sent by the remote VTEP X and received by the second gateway device GW2, but after traffic is sent by the remote VTEP X and received by the first gateway device GW, includes (1) proactively forcing, by the second gateway device GW2, the remote VTEP X to send an ARP packet from an attached host, to the second gateway device GW2, and (2) establishing, by the second gateway device GW2 and responsive to receiving the packet, a VXLAN tunnel from the second gateway device GW2 to the remote VTEP X.

In some example implementations, the act of establishing, by the second gateway device GW2, a VXLAN tunnel to the remote VTEP X before traffic is sent by the remote VTEP X and received by the second gateway device GW2, but after traffic is sent by the remote VTEP X and received by the first gateway device GW, includes (1) receiving, by the second gateway device GW2, a type-2 route for a MAC and IP address of host A, including an Ethernet Segment Identifier (ESI), from the first gateway device GW1, (2) learning, by the second gateway device GW2, a multihomed Ethernet Segment Identifier (ESI) and a bridge domain of host A from the type-2 route, (3) determining, by the second gateway device GW2, and based on the multihoming ESI associated with the type-2 route, that host A is behind the VXLAN data plane network instead of a regular CE device, (4) flooding, by the second gateway device GW2, an ARP request to a plurality of remote VTEPs on the VXLAN, including VTEP X, (5) receiving, by the second gateway device GW2, an ARP reply, and (6) creating the VXLAN tunnel from the second gateway device GW2 to VTEP X responsive to receiving the ARP reply.

In some example implementations, the act of establishing, by the second gateway device GW2, a VXLAN tunnel to the remote VTEP X before traffic is sent by the remote VTEP X and received by the second gateway device GW2, but after traffic is sent by the remote VTEP X and received by the first gateway device GW1, includes (1) receiving, by the second gateway device GW2, a type-2 route for a MAC address and an IP address of host A, including an Ethernet Segment Identifier (ESI), from the first gateway device GW1, (2) checking, by the second gateway device GW2, whether the MAC/IP is associated with an established data plane VXLAN tunnel, (3) responsive to a determination by the second gateway device GW2 that the second gateway device GW2 cannot find an established data plane VXLAN tunnel associated with the MAC/IP, (i) generating, by the second gateway device GW2, a host generated ARP request packet for host A's IP address received in the type-2 route, wherein an outer IP header of the host-generated ARP packet has a unique lookback address of the second gateway device GW2 as the source IP address and a multicast group for the bridge domain as a destination IP address, and wherein an inner ARP request packet has a source IP/MAC set to GW2's IRB's unique MAC/IP address, and (ii) delivering the host-generated ARP request to host A through an underlay PIM to all remote VTEPs of the VXLAN, (iii) receiving, by the second gateway device GW2, an ARP reply, and (iv) creating the VXLAN tunnel to VTEP X responsive to receiving the ARP reply.

In some such example implementations, the host-generated ARP request triggers data plane learning at the remote VTEPs of the VXLAN. In some such implementations, the remote VTEP X learns the unique loopback address of the second gateway device GW2 and establishes a VXLAN tunnel to the second gateway device GW2 if it had not already done so. For example, the remote VTEP X may also learn GW2's IRB's MAC/IP is behind its VXLAN tunnel to GW2, whereby, when a unicast ARP reply comes back from host A, this time the remote VTEP X sends the unicast ARP reply to the second gateway device GW2 directly such that the second gateway device GW2 has forced the remote VTEP X to send a data packet to it. Some such example implementations may further include (v) updating, by the second gateway device GW2, a forwarding entry for host A's MAC, whereby it becomes unnecessary for the gateway device GW2 to flood traffic destinated to host A and whereby blackholing is avoided by any non-designated forwarder gateway device, (vi) receiving, by the second gateway device GW2, unicast traffic to host A, and (vii) forwarding the unicast traffic to host A using the forwarding entry, without flooding and without traffic blackholing.

In some example implementations, the act of establishing, by the second gateway device GW2, a VXLAN tunnel to the remote VTEP X before traffic is sent by the remote VTEP X and received by the second gateway device GW2, but after traffic is sent by the remote VTEP X and received by the first gateway device GW1, includes (1) treating, by the first gateway GW1 and the second gateway GW2, each VTEP as an individual entity connecting to the first and second gateway devices GW1 and GW2 in all-active mode, and (2) auto-deriving, by the first gateway GW1, the ESI of a VTEP based on the IP address of the remote VTEP. In some such implementations, the auto-derived ESI is encoded as a 10-octet data structure as follows:

Type: 4+Remote SW-VTEP IP address+4 byte local discriminator value+0x00, wherein the 4 byte local discriminator value is locally provisioned on both the first gateway device GW1 and the second gateway device GW2, and indicates that the ES associated with this ESI is connected to a remote VTEP, and that any MAC/IP associated with that ESI is originally learned from a data plane VXLAN. In some such example implementations, the first and second gateway devices GW1 and GW2 use the same local discriminator value or the same part of its 4-octet value to signify that any MAC/IP address associated with that ESI is behind a remote SW-VTEP.

In some example implementations, the act of establishing, by the second gateway device GW2, a VXLAN tunnel to the remote VTEP X before traffic is sent by the remote VTEP X and received by the second gateway device GW2, but after traffic is sent by the remote VTEP X and received by the first gateway device GW1, includes (1) receiving, by the second gateway GW2, a type-2 route advertisement from the first gateway GW1, wherein the type-2 route advertisement includes the MAC and IP addresses of the host A, an Ethernet Tag ID, and an Ethernet Segment Identifier (ESI), (2) deriving, by the second gateway GW2, that the MAC address and the IP address of host A was learned from a data plane VXLAN. based on type-4 ESI and local discriminator value, (3) learning, by the second gateway GW2, the IP address of the VTEP X from the ESI, and (4) creating, by the second gateway, a data plane VXLAN tunnel to VTEP X based on that type-2 route advertisement received from the first gateway GW1. In some such implementations, the VTEP x uses an IPv4 address. Some such example implementations further include (5) updating, by the second gateway device GW2, a forwarding entry for host A's MAC, whereby it becomes unnecessary for the gateway device GW2 to flood traffic destinated to host A, (6) receiving, by the second gateway device GW2, unicast traffic to host A, and (7) forwarding the unicast traffic to host A using the forwarding entry, without flooding and without traffic blackholing.

In some example implementations, the act of establishing, by the second gateway device GW2, a VXLAN tunnel to the remote VTEP X before traffic is sent by the remote VTEP X and received by the second gateway device GW2, but after traffic is sent by the remote VTEP X and received by the first gateway device GW1, includes (1) receiving, by the second gateway device GW2, from the first gateway device GW1, a type-2 EVPN route including a MAC address and an IP address of the host A, and the IP address of VTEP X in an extended community, wherein the extended community indicates (i) that the MAC address and the IP address of the host A was leaned from a data plane VXLAN, and (ii) the MAC address and the IP address were learned from VTEP X identified by the IP address specified in the extended community, and (2) responsive to receiving, by the second gateway device GW2, the type-2 EVPN route, establishing, by the second gateway device GW2, a data plane VXLAN tunnel to the VTEP X. Some such example implementations, further include (3) updating, by the second gateway device GW2, a forwarding entry for host A's MAC, whereby it becomes unnecessary for the gateway device GW2 to flood traffic destinated to host A, (4) receiving, by the second gateway device GW2, unicast traffic to host A, and (5) forwarding the unicast traffic to host A using the forwarding entry, without flooding and without traffic blackholing. In some such example implementations, the IP address is an IPv4 address, or the IP address is an IPv6 address.

§ 3. BRIEF DESCRIPTION OF THE DRAWINGS

FIGS. 2A-2C illustrates an example EVPN-VXLAN packet header format that may be used to encapsulate an Ethernet frame, as well as an MPLS header.

FIGS. 16A and 16B is an example of operations of the example architecture of FIG. 15.

§ 4 DETAILED DESCRIPTION

The present disclosure may involve novel methods, apparatus, message formats, and/or data structures for avoiding traffic flooding and/or blackholing for known unicast traffic when an EVPN is inter-connected to data plane VXLAN in all-active mode. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 ACRONYMS AND TERMS

BUM: broadcast, unknown unicast, and multicast
CE: customer edge device
DC: data center
DCI: data center interconnect
EVPN: Ethernet VPN
GW: gateway
HYPERVISOR: a program used to run and/or manage virtual machines (VMs) on a computer
IRB: integrated routing and bridging
LAG: link aggregation group
MP-BGP: multiprotocol border gateway protocol
PE: provider edge device
PIM: protocol independent multicast
TOR: top of rack
VCP: virtual chassis fabric
VLAN: virtual local area network
VM: virtual machine
VN: virtual network
VPN: virtual private network
VNI: VXLAN network identifier
VRF: virtual routing and forwarding
VTEP: VXLAN tunnel end point
VXLAN: virtual extensible local area network

§ 4.2 EXAMPLE METHODS FOR REDUCING OR ELIMINATING UNNECESSARY FLOODING AND/OR BLACKHOLING OF KNOWN UNICAST TRAFFIC

Figure 1:
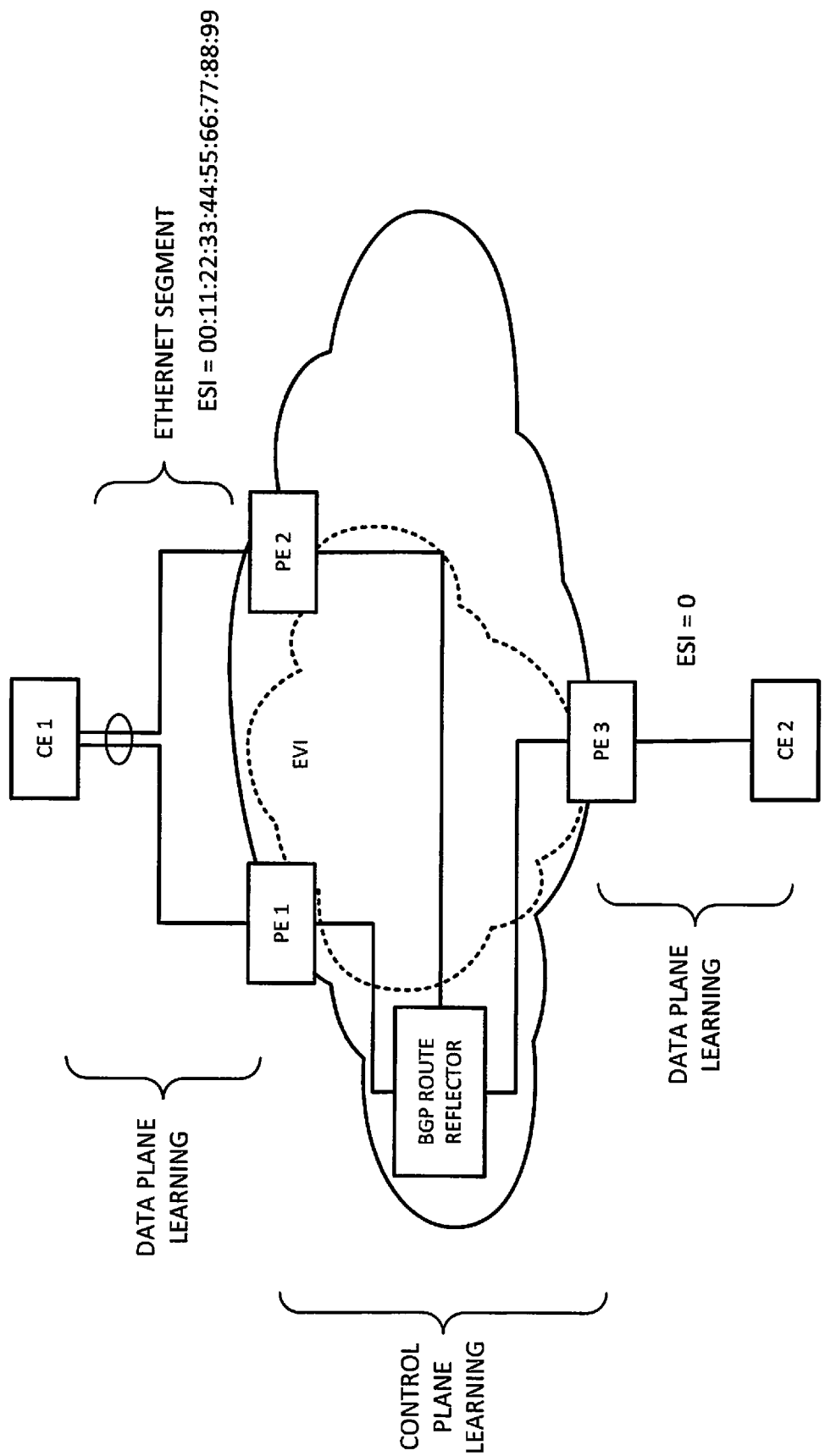
FIG. 1 is an example network topology used to provide an overview of Ethernet virtual private networks (EVPNs)
Figure 3:
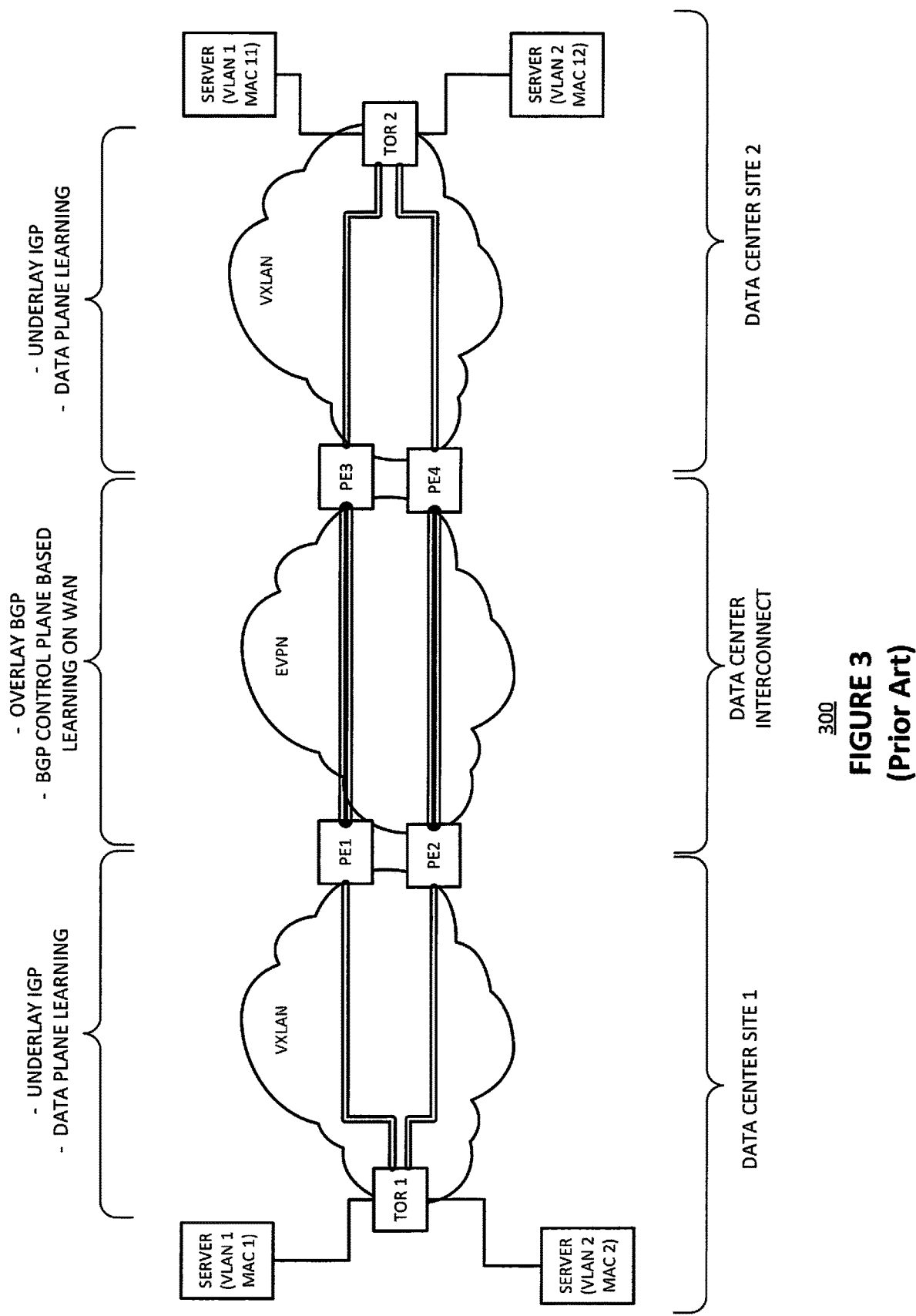
FIG. 3 is an example network topology used to provide an overview of EVPN-VXLAN integration.
Figure 4:
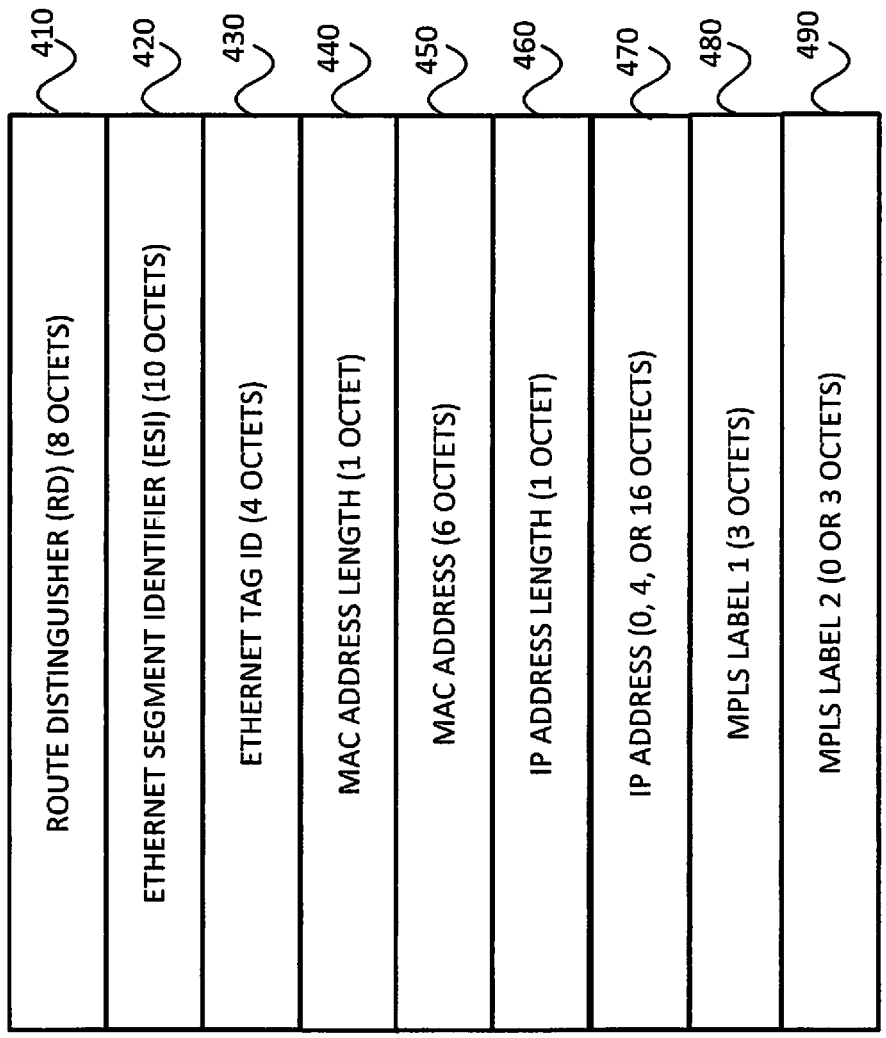
FIG. 4 illustrates an example data structure consistent with a Type 2 route format.
Figure 5:
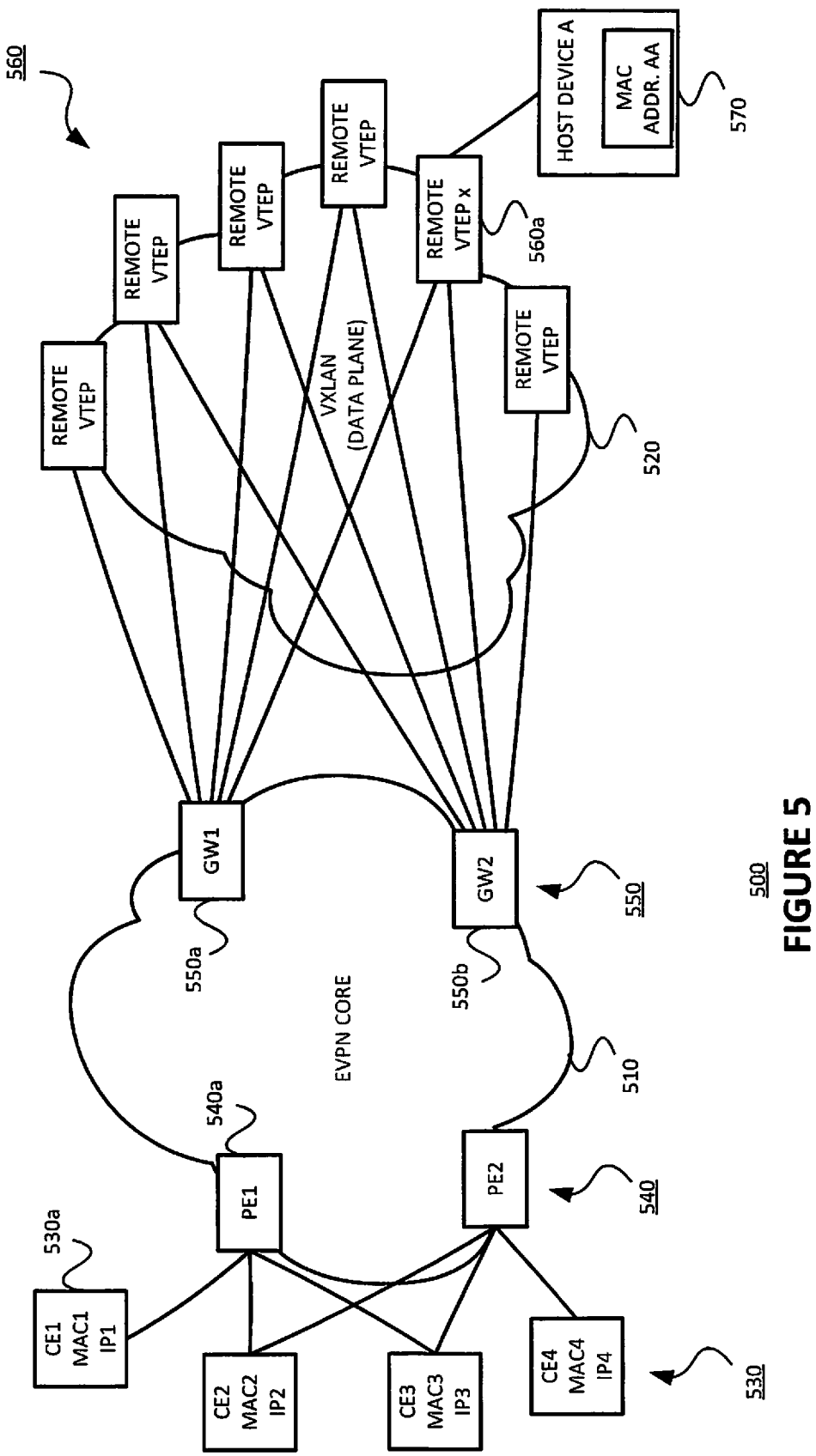
FIG. 5 is an example network topology used to illustrate challenges arising when using all-active multihoming at gateway devices between a EVPN and a VXLAN.

Still referring to FIG. 5, to address unnecessary flooding and/or blackholing of known unicast traffic to host A 570, the second gateway (GW2) 550b needs to establish a VXLAN tunnel to remote VTEP X 560a even though at this point, none of the traffic sent by the remote VTEP X 560a has taken the path to GW2 550b.

Figure 6:
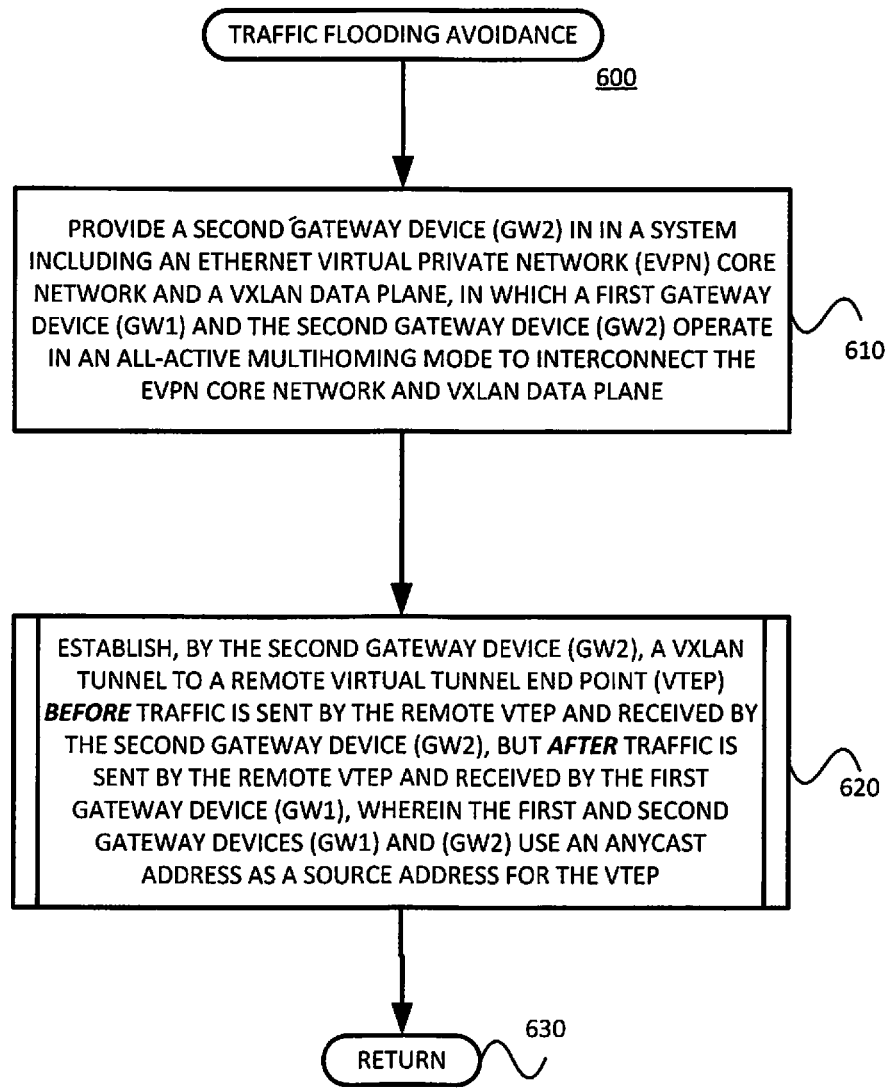
FIG. 6 is a flow diagram of an example method for avoiding traffic flooding in a manner consistent with the present description.

FIG. 6 is a flow diagram of an example method 600 for avoiding traffic flooding in a manner consistent with the present description. First, a second gateway device GW2 is provided in a system including an Ethernet Virtual Private Network (EVPN) core network and a VXLAN data plane, in which a first gateway device (GW1) and the second gateway device (GW2) operate in an all-active multihoming mode to interconnect the EVPN core network and VXLAN data plane. (Block 610) The example method 600 then establishes, by the second gateway device GW2, a VXLAN tunnel to a remote VTEP before traffic is sent by the remote VTEP and received by the second gateway device GW2, but after traffic is sent by the remote VTEP and received by the first gateway device GW1, wherein the first and second gateway devices GW1 and GW2 use an anycast address as a source address for VTEP. (Block 620) The example method 600 is then left. (Return node 630)

Referring back to block 620, this act can be performed using various different solutions described in §§ 4.2.1-4.2.3 below with reference to FIGS. 7-12. The example methods described can be performed, at least in part, by the second gateway device (GW2) (or more generally, by a gateway device operating in a scenario corresponding to that of GW2 described above).

§ 4.2.1 ADDRESSING UNNECESSARY FLOODING AND/OR BLACKHOLING USING PROXY ARP

Figure 7:
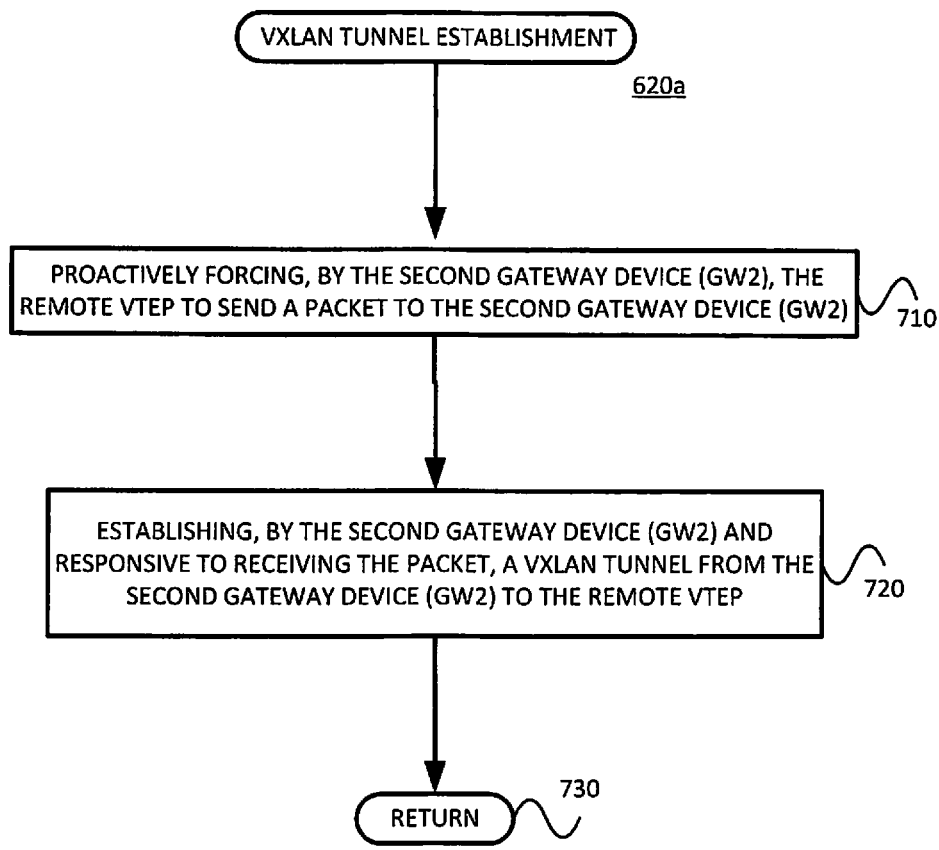
FIGS. 7-12 are flow diagrams of example methods for VXLAN tunnel establishment in a manner consistent with the present description.

FIG. 7 is a flow diagram of a first example method 620*a* for VXLAN tunnel establishment in a manner consistent with the present description. Referring back to the example of FIG. 5, to learn the IP address of the remote SW-VTEP X 560*a*, the second gateway (GW2) 550*b* can proactively force the remote VTEP X 560*a* to send a packet to it 550*b* (Block 710) and establish a VXLAN tunnel to the remote VTEP X 560*a* (Block 720), before the example method 620*a* is left (Return Node 730). Details of example methods to achieve this are described below. The example mechanisms described below can be used to shorten a traffic blackholing period to host A (e.g., to its minimum).

Figure 8:
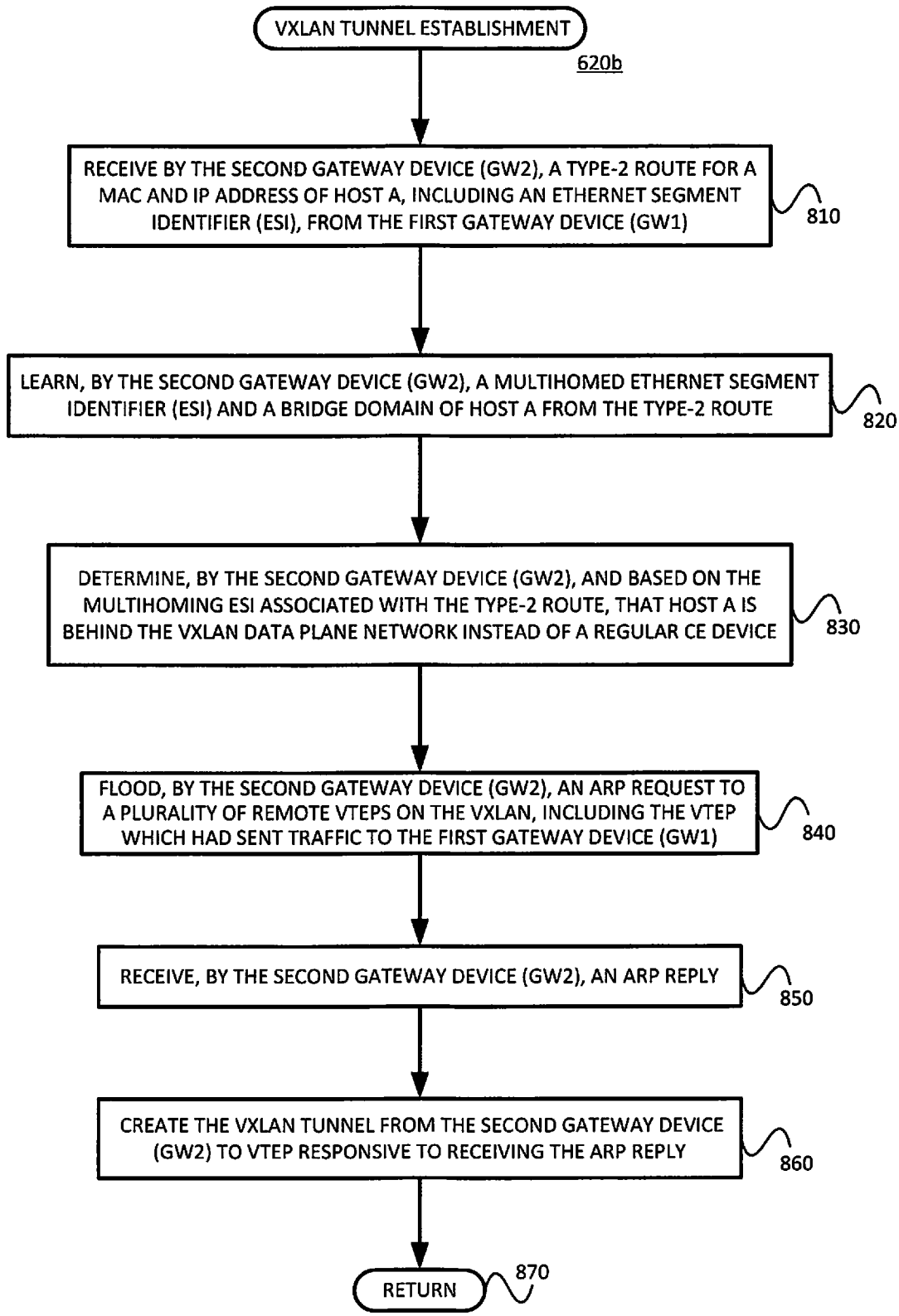
Figure 9:
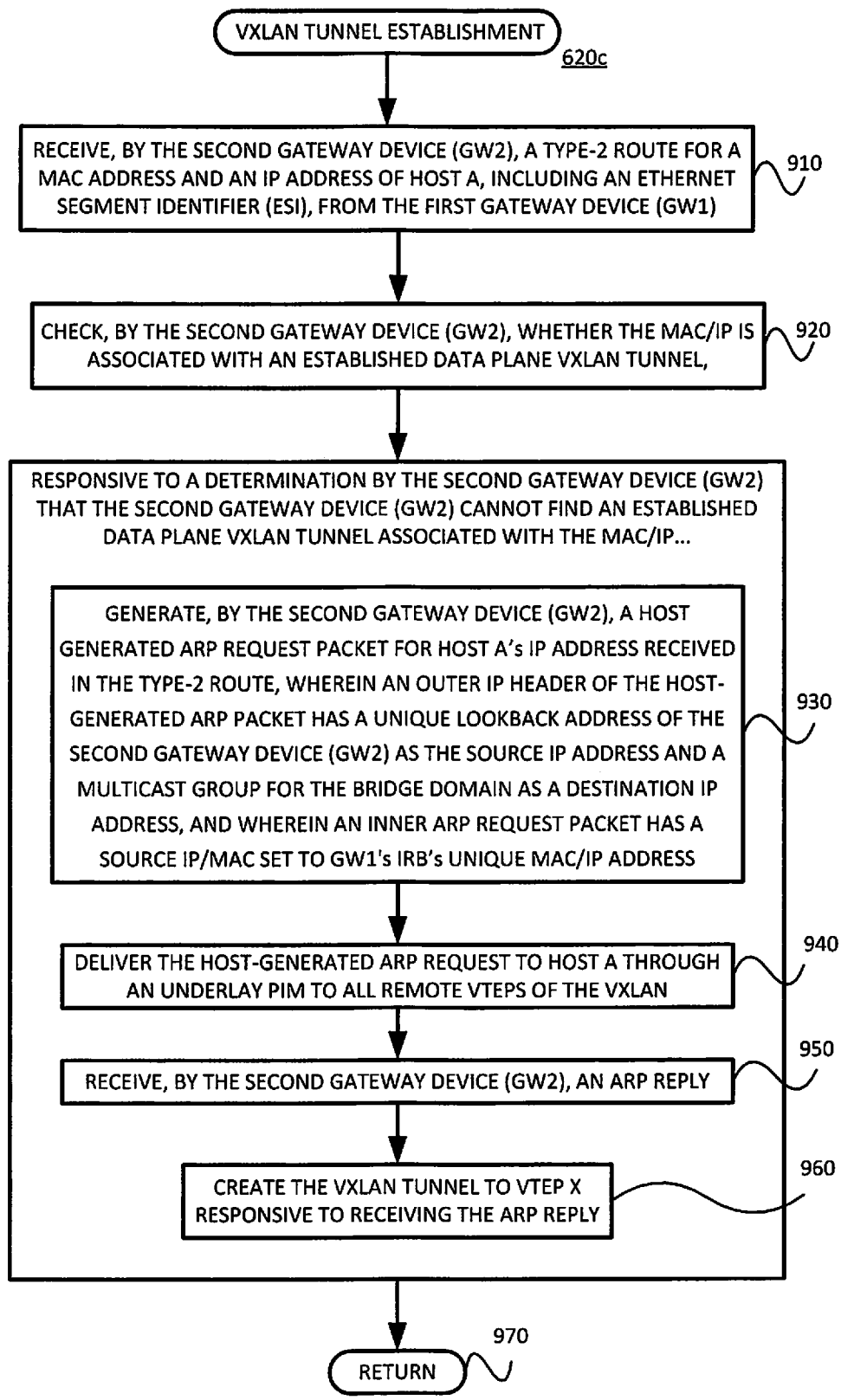

FIGS. 8 and 9 are flow diagrams of example method 620*b* and 620*c*, respectively, for VXLAN tunnel establishment a manner consistent with the present description. When the second gateway (GW2) 550*b* receives the type-2 route for host A's MAC/IP from the first gateway (GW1) 550*b* (Block 810, Block 910), besides the MAC/IP address(es), GW2 550*b* also learns its multihomed ESI and the bridge domain (Block 820). Based on the multihoming ESI associated with the type-2 route, GW2 550*b* learns that host A 560*a* is behind the VXLAN data plane network instead of a regular CE device. (Block 830)

The second gateway (GW2) 550*b* then checks whether the MAC/IP is associated with an established data plane VXLAN tunnel. (Block 920) If it 550*b* cannot find one, it 550*b* sends host generated ARP request packet for host A's IP address received in the type-2 route. (Block 930) The outer IP header for this host-generated ARP packet has GW2's unique loopback IP address as the source IP address and the multicast group for the bridge domain as the destination IP address. The inner ARP request packet has the source IP/MAC set to GW1's IRB's unique MAC/IP address. This host-generated ARP request is then delivered through the underlay PIM to all the remote VTEPs 560. (Block 840 and Block 940)

In response to the flooded (via PIM underlay) ARP request, data plane learning is triggered at the remote VTEPs 560. The remote VTEP X 560*a* learns the unique loopback IP address of the second gateway (GW2) 550*b* and establishes a VXLAN tunnel to GW2 550*b* if it has not done so yet. The remote VTEP X 560*a* also learns that the IRB's MAC/IP of GW2 550*b* is behind its 560*a* VXLAN tunnel to GW2 550*b*. When the unicast ARP reply comes back from host A 570, this time the remote VTEP X 560*a* sends the unicast ARP reply to GW2 550*b* directly. (Block 850 and Block 950)

At this point, the second gateway device (GW2) 550*b* has forced the remote VTEP X 560*a* to send a data packet to it 550*b*. Therefore, it 550*b* can create a VXLAN tunnel to the remote VTEP X 560*a* and update the forwarding entry for the MAC of host A 570 thereafter. (Block 860 and Block 960) The example method 620*b* or 620*c* is then left. (Return Node 870 or Return Node 970)

As a result, GW2 550*b* stops the unnecessary flooding and/or blackholing for traffic destinated to host A. Instead, GW2 550*b* can unicast traffic to host A. Note that PE1 540*a* has no knowledge of which GW 550 is the DF (or NDF). Only multihomed PEs attached to the same ESI knows which one is the DF or NDF. Note also that due to split horizon, GW1 550*a* may not send traffic it received from the EVPN core back to the EVPN core.

The foregoing solutions rely on a GW (in the foregoing example, GW2) to generate an ARP request. Alternative solutions to avoid unnecessary flooding of the ARP request are described in the following sections. However, the flooding of a single (or limited number of) ARP request is preferred over flooding a relatively larger number of data packets.

§ 4.2.2 ADDRESSING UNNECESSARY FLOODING AND/OR BLACKHOLING WHEN ESI IS ASSIGNED ON PER REMOTE SW-VTEP BASIS

Figure 10:
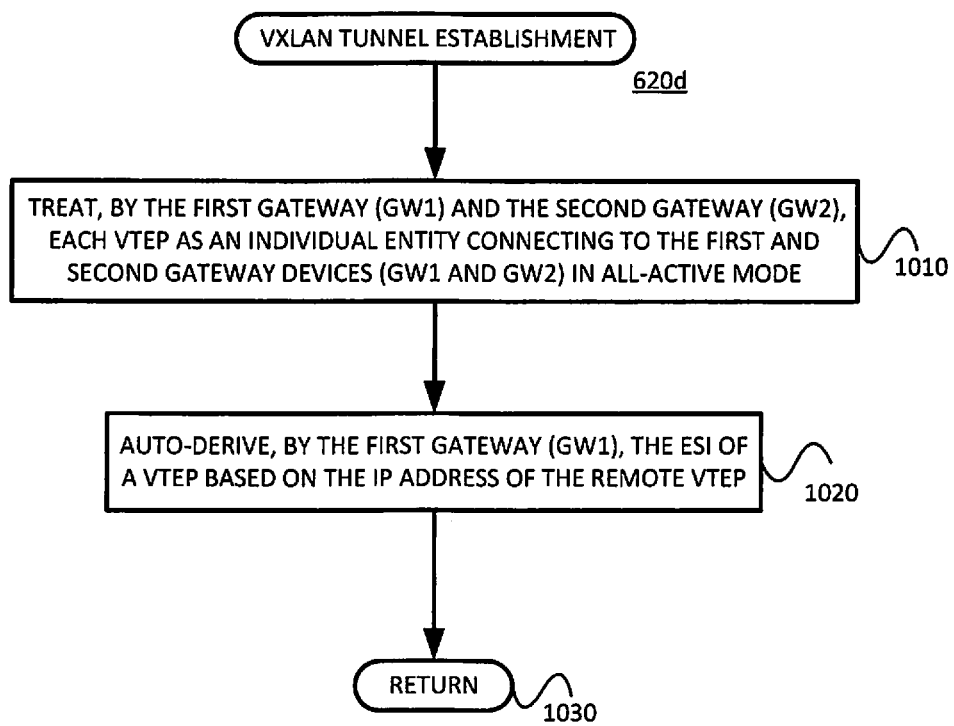
Figure 11:
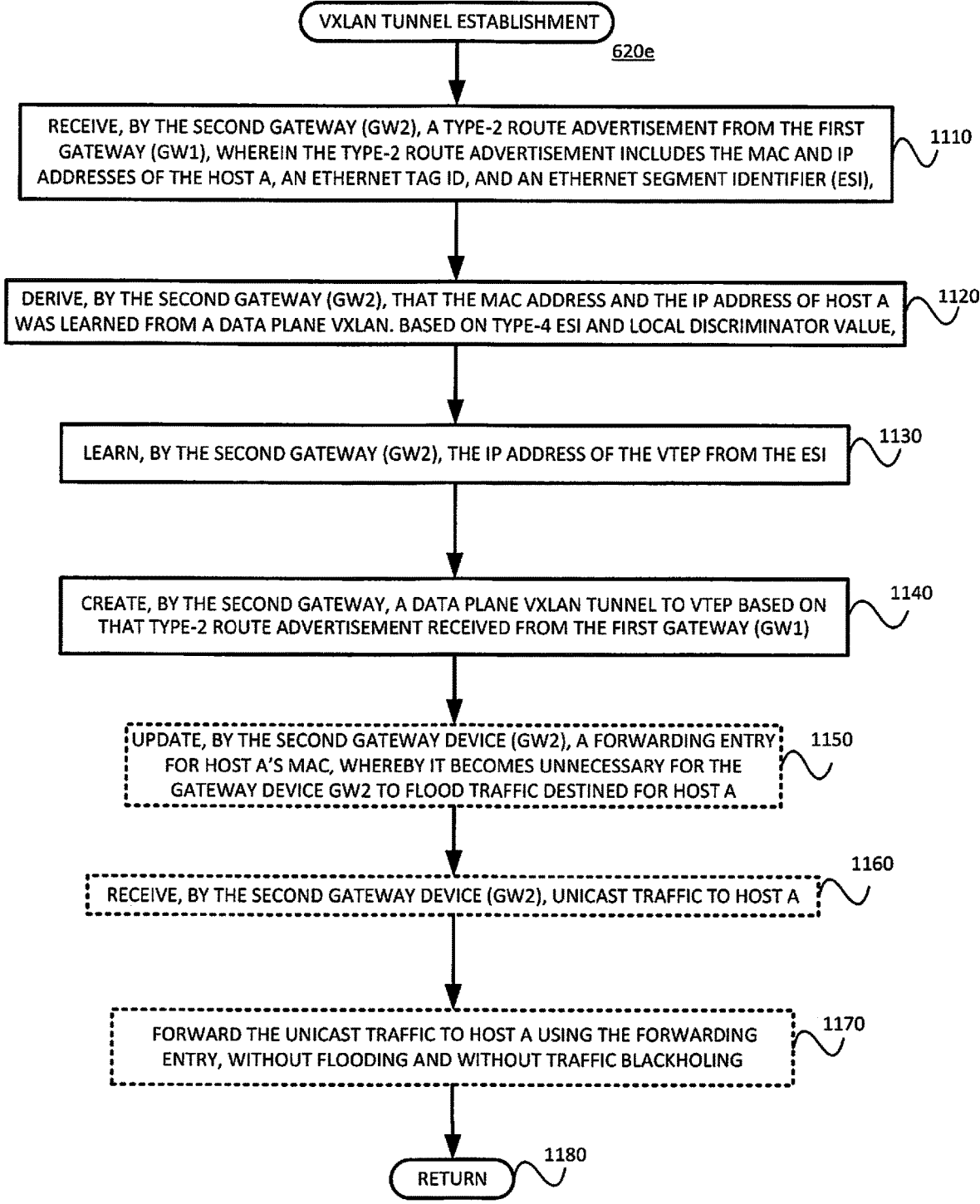

FIGS. 10 and 11 are flow diagrams of example methods 620*d* and 620*e*, respectively, for establishing an VXLAN tunnel from a GW to a remote VTEP in a manner consistent with the present description.

Referring back to FIG. 5, when each SW-VTEP 560 is treated as an individual entity connecting to the GWs 550 in all-active mode, its ESI can be auto-derived based on the IP address of the remote SW-VTEP 560. (See also, block 1010 of the example method 620*d* of FIG. 10.) This 10-octet auto-derived ESI may be encoded as follows:

Type: 4+Remote SW-VTEP IP address+4 byte local discriminator value+0x00.

A local discriminator value is locally provisioned on a GW 550. It is used to signify that the ES associated with this ESI is connected to a remote SW-VTEP, and any MAC/IP associated with that ESI is originally learned from a data plane VXLAN 520. All GWs 550 in the redundant set may choose to use the same local discriminator value or the same part of its 4-octet value to signify that any MAC/IP associated with that ESI is behind a remote SW-VTEP.

Using the same example as discussed above with reference to FIG. 5, CE1 530*a* ARPs for the MAC address of host A 570. Host A 570 is behind remote SW-VTEP X 560*a*. In reply to the ARP request from CE1 530*a*, host A 570 sends an ARP reply back towards CE1 530*a*. Due to the Anycast VTEP IP address used by both GW1 550*a* and GW2 550*b*, let us assume that the unicast ARP reply is received by GW1 550*a*.

When GW1 550*a* receives the ARP reply, GW1 550*a* learns the MAC/IP address(es) of host A 570, as well as the IP address of the remote SW-VTEP X 560*a*. GW1 550*a* establishes a data plane VXLAN tunnel to the remote VTEP X 560*a*. In addition, GW1 550*a* also auto derives the ESI for the SW-VTEP X 560*a* based on its IP address and the local discriminator value that is pre-assigned for the data plane VXLAN. (See also, block 1020 of FIG. 10.)

Per normal EVPN procedure, GW1 550*a* advertises the MAC/IP address(es), Ethernet Tag ID, and ESI of host A 570 through an EVPN type-2 route to other PEs of the EVPN, including the PE GW2 550*b*. When GW2 550*b* receives this type-2 route (Block 1110 of FIG. 11), it 550*b* derives, based on type-4 ESI and local discriminator value, that the MAC/IP address(es) combination of host A 570 was learned from a data plane VXLAN. (Block 1120) GW2 550*b* also learns the IP address of the remote SW-VTEP X 560*a* from the ESI. (Block 1130) GW2 550*b* can thus create a data plane VXLAN tunnel to the remote VTEP X 560*b* based on that EVPN type-2 route from GW1 550*a*. (Block 1140)

At this time, traffic from CE1 530*a* to host A 570 is no longer blackholed, nor is it flooded. More specifically, GW2

550*b* can update a forwarding entry for the MAC address of host A 570 (whereby it becomes unnecessary for GW2 550*b* to flood traffic destined for host A 570). Therefore, when GW2 550*b* receives unicast traffic destined for host A 570 (Block 1160), it 550*b* forwards the unicast traffic to host A 570 using the forwarding entry (Block 1170).

The example solution in this section, described with reference to FIGS. 10 and 11, is limited to remote SW-VTEPs 560 using IPv4 address (because the auto-derived ESI is limited to 10 octets). It does not apply to IPv6 VTEP address.

§ 4.2.3 ADDRESSING UNNECESSARY FLOODING AND/OR BLACKHOLING USING EXTENDED COMMUNITY

Figure 12:
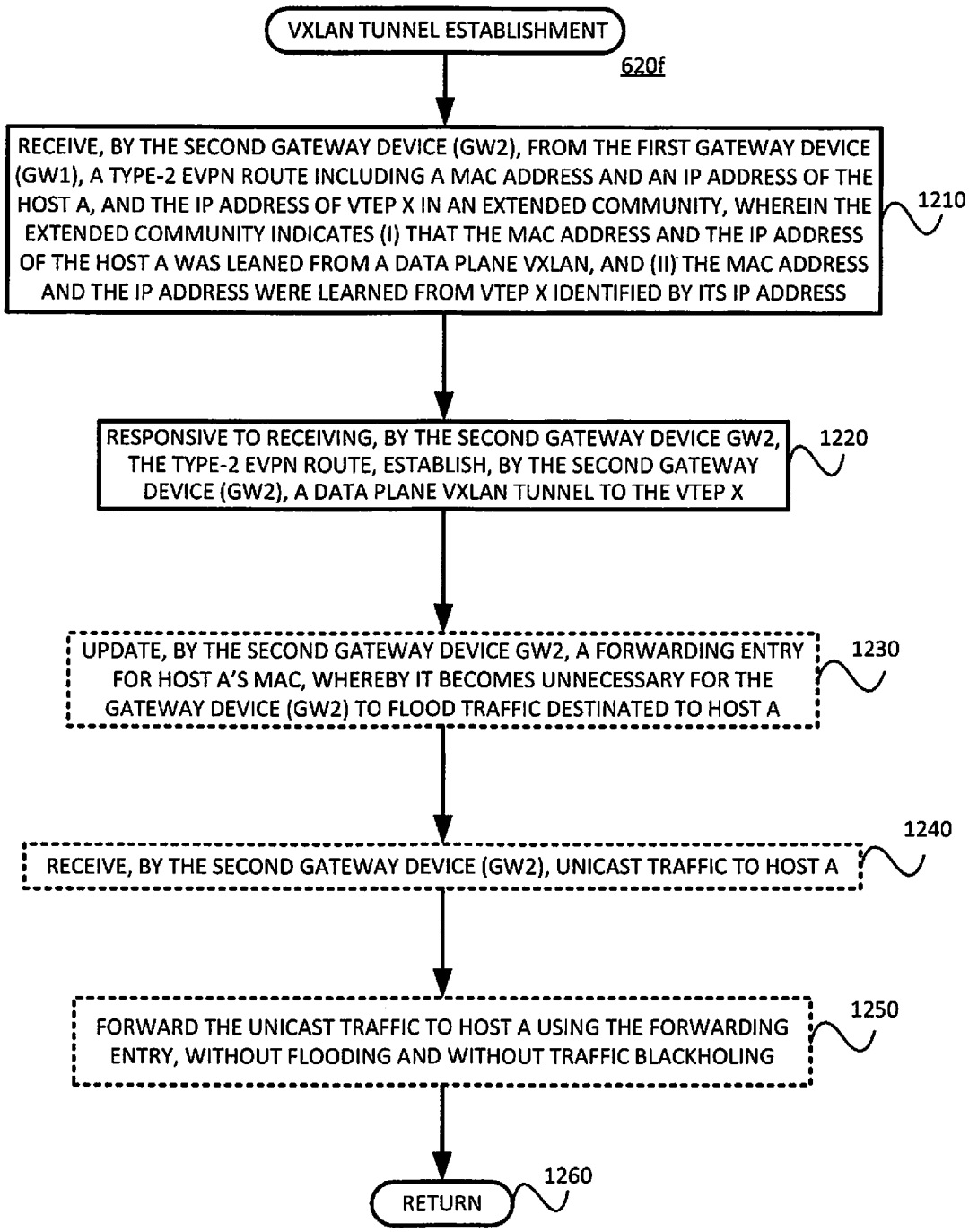

FIG. 12 is a flow diagram of an example method 620*f* for establishing an VXLAN tunnel from a GW to a remote VTEP in a manner consistent with the present description. Referring back to FIG. 5, and using the same example as before, CE1 530*a* ARPs for the MAC address of host A 570. Host A 570 is behind remote SW-VTEP X 560*a*. In reply to the ARP request from CE1 530*a*, host A 570 sends an ARP reply back to CE1 530*a*. Due to the Anycast VTEP IP address used by both GW1 550*a* and GW2 550*b*, let us assume that that the unicast ARP reply is received by GW1 550*a*.

When GW1 550*a* receives the ARP reply, it 550*a* learns the MAC/IP address(es) of host A 570, as well as the IP address of the remote SW-VTEP X 560*a*. In response, GW1 550*a* establishes a data plane VXLAN tunnel to the remote VTEP X 560*a* and updates its forwarding entry accordingly.

To avoid unnecessary flooding and/or blackholing traffic to host A 570, GW1 550*a* informs GW2 550*b* about the IP address of the remote SW-VTEP X 560*a* when it 550*b* advertises the MAC/IP address(es) of host A 570 to GW2 550*b* in the control plane.

When GW1 550*a* advertises the MAC/IP address(es) host A 570 through an EVPN type-2 route to the rest of EVPN PEs 540, it 550*a* also encodes the IP address of the remote SW-VTEP X 560*a* in a new extended community. This extended community is used to tell the receiving PEs 540 that:

the MAC/IP address was learned from a data plane VXLAN; and the corresponding remote VTEP address that the MAC/IP is learned from.

When GW2 550*b* receives this type-2 EVPN route (Block 1210 of FIG. 12), based on information encoded in the extended community, GW2 550*b* learns the IP address of the remote SW-VTEP X 560*a*. GW2 550*b* can now establish a data plane VXLAN tunnel to the SW-VTEP X 560*a* (Block 1220) and update the forwarding entry for host A 570 accordingly (Block 1230). Now traffic from other EVPN PEs 540 destinated to host A 570 can be efficiently load-balanced between GW1 550*a* and GW2 550*b*, since that both GW1 550*a* and GW2 550*b* can unicast the traffic to host A 570 without the need of flooding. (Blocks 1240 and 1250)

§ 4.3 EXAMPLE APPARATUS

Figure 13:
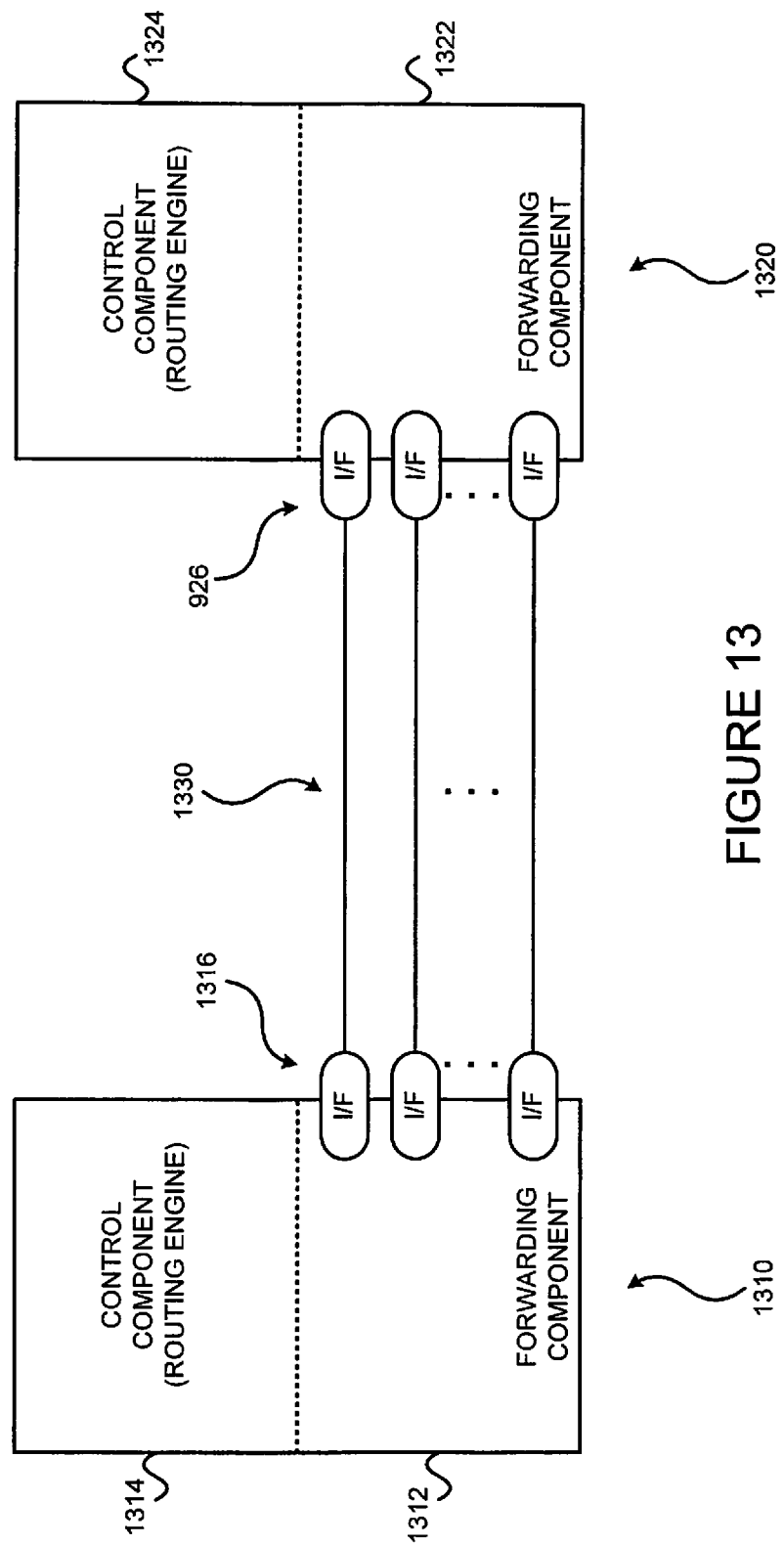
FIG. 13 illustrates two data forwarding systems, which may be used as nodes, coupled via communications links, in a communications network, such as a communications network including an EVPN and/or a VXLAN.

The data communications network nodes (e.g., PE devices, GW devices, remote VTEPs, etc.) may be data forwarding devices, such as routers for example. FIG. 13 illustrates two data forwarding systems 1310 and 1320 coupled via communications links 1330. The links may be physical links or "wireless" links. The data forwarding systems 1310,1320 may be routers for example. If the data forwarding systems 1310,1320 are example routers, each may include a control component (e.g., a routing engine) 1314,1324 and a forwarding component 1312,1322. Each data forwarding system 1310,1320 includes one or more interfaces 1316,1326 that terminate one or more communications links 1330.

As just discussed above, and referring to FIG. 14, some example routers 1400 include a control component (e.g., routing engine) 1410 and a packet forwarding component (e.g., a packet forwarding engine) 1490.

The control component 1410 may include an operating system (OS) kernel 1420, routing protocol process(es) 1430, label-based forwarding protocol process(es) 1440, interface process(es) 1450, user interface (e.g., command line interface) process(es) 1460, and chassis process(es) 1470, and may store routing table(s) 1439, label forwarding information 1445, and forwarding (e.g., route-based and/or label-based) table(s) 1480. As shown, the routing protocol process(es) 1430 may support routing protocols such as the routing information protocol ("RIP") 1431, the intermediate system-to-intermediate system protocol ("IS-IS") 1432, the open shortest path first protocol ("OSPF") 1433, the enhanced interior gateway routing protocol ("EIGRP") 1434 and the border gateway protocol ("BGP") 1435, and the label-based forwarding protocol process(es) 1440 may support protocols such as BGP 1435, the label distribution protocol ("LDP") 1436, the resource reservation protocol ("RSVP") 1437, EVPN 1438 and L2VPN 1439. Protocols associated with VXLANs may also be provided. One or more components (not shown) may permit a user 1465 to interact with the user interface process(es) 1460. Similarly, one or more components (not shown) may permit an outside device to interact with one or more of the router protocol process(es) 1430, the label-based forwarding protocol process(es) 1440, the interface process(es) 1450, and the chassis process(es) 1470, via Simple Network Management Protocol (SNMP) 1485, and such processes may send information to an outside device via SNMP 1485.

The packet forwarding component 1490 may include a microkernel 1492 over hardware components (e.g., ASICs, switch fabric, optics, etc.) 1491, interface process(es) 1493, ASIC drivers 1494, chassis process(es) 1495 and forwarding (e.g., route-based and/or label-based) table(s) 1496.

Figure 14:
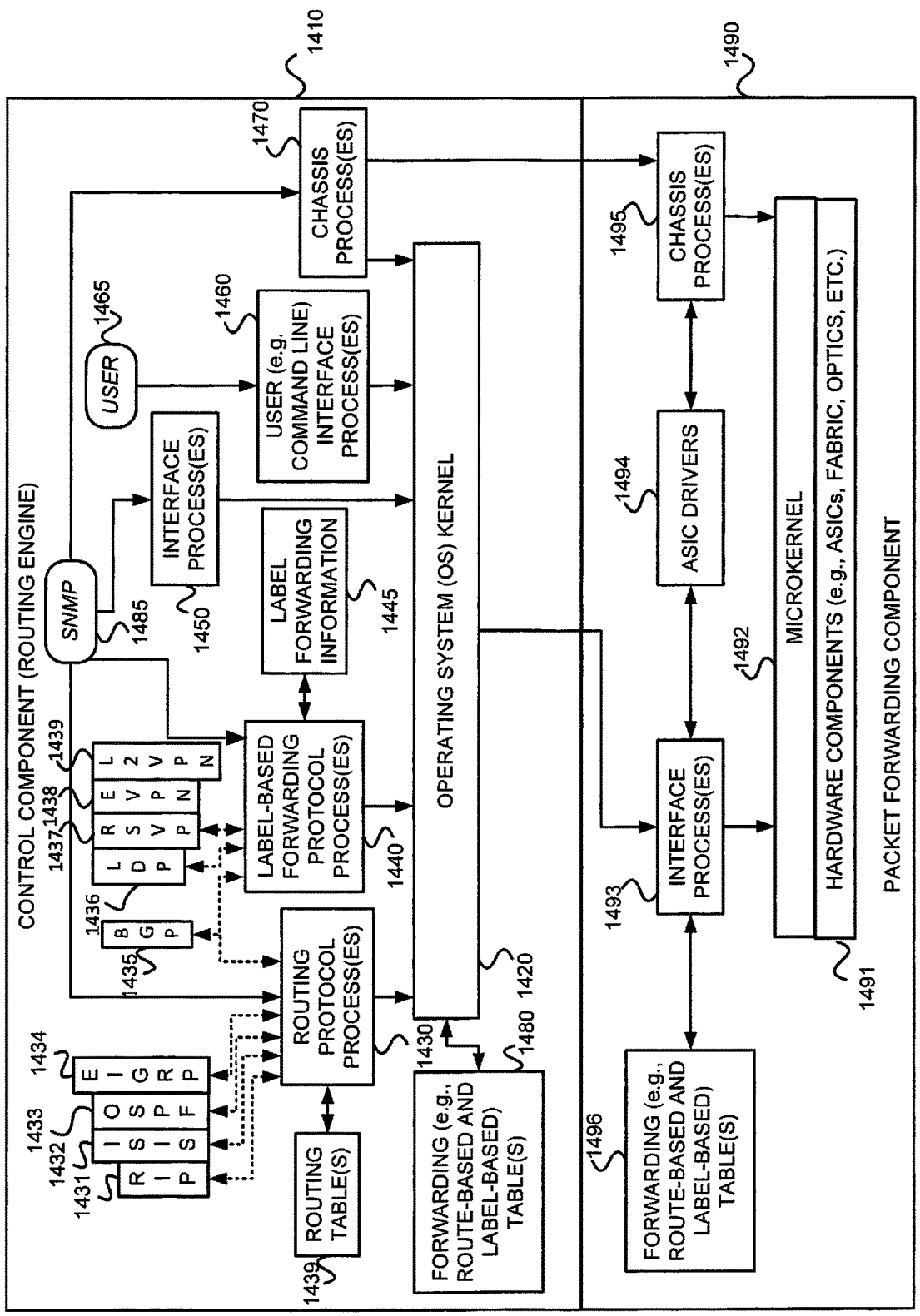
FIG. 14 is a block diagram of an example router which may be used a communications network, such as communications network including an EVPN and/or a VXLAN.

In the example router 1400 of FIG. 14, the control component 1410 handles tasks such as performing routing protocols, performing label-based forwarding protocols, control packet processing, etc., which frees the packet forwarding component 1490 to forward received packets quickly. Note that the control component 1410 is also responsible for host generated ARP requests and processing ARP replies. That is, received control packets (e.g., routing protocol packets and/or label-based forwarding protocol packets) are not fully processed on the packet forwarding component 1490 itself, but are passed to the control component 1410, thereby reducing the amount of work that the packet forwarding component 1490 has to do and freeing it to process packets to be forwarded efficiently. Thus, the control component 1410 is primarily responsible for running routing protocols and/or label-based forwarding protocols, maintaining the routing tables and/or label forwarding information, sending forwarding table updates to the packet forwarding component 1490, and performing system management. The example control component 1410 may handle routing protocol packets, provide a management interface, provide configuration management, perform accounting, and provide alarms. The processes 1430, 1440, 1450, 1460 and 1470 may be modular, and may interact with the OS kernel 1420. That is, nearly all of the processes communicate directly with the OS kernel 1420. Using modular software that cleanly separates processes from each other isolates problems of a given process so that such problems do not impact other processes that may be running. Additionally, using modular software facilitates easier scaling.

Still referring to FIG. 14, the example OS kernel 1420 may incorporate an application programming interface ("API") system for external program calls and scripting capabilities. The control component 1410 may be, for example, based on an Intel PCI platform running the OS from flash memory, with an alternate copy stored on the router's hard disk. The example OS kernel 1420 may be layered on the Intel PCI platform and may establish communication between the Intel PCI platform and processes of the control component 1410. The OS kernel 1420 also ensures that the forwarding tables 1496 in use by the packet forwarding component 1490 are in sync with those 1480 in the control component 1410. Thus, in addition to providing the underlying infrastructure to control component 1410 software processes, the OS kernel 1420 also provides a link between the control component 1410 and the packet forwarding component 1490.

Referring to the routing protocol process(es) 1430 of FIG. 14, this process(es) 1430 provides routing and routing control functions within the platform. In this example, the RIP 1431, ISIS 1432, OSPF 1433 and EIGRP 1434 (and BGP 1435) protocols are provided. Naturally, other routing protocols may be provided in addition, or alternatively. Similarly, the label-based forwarding protocol process(es) 1440 provides label forwarding and label control functions. In this example, the LDP 1436, RSVP 1437, EVPN 1438 and L2VPN 1439 (and BGP 1435) protocols are provided. Naturally, other label-based forwarding protocols (e.g., MPLS, SR, etc.) may be provided in addition, or alternatively. In the example router 1400, the routing table(s) 1439 is produced by the routing protocol process(es) 1430, while the label forwarding information 1445 is produced by the label-based forwarding protocol process(es) 1440.

Still referring to FIG. 14, the interface process(es) 1450 performs configuration of the physical interfaces and encapsulation.

The example control component 1410 may provide several ways to manage the router. For example, it 1410 may provide a user interface process(es) 1460 which allows a system operator 1465 to interact with the system through configuration, modifications, and monitoring. The SNMP 1485 allows SNMP-capable systems to communicate with the router platform. This also allows the platform to provide necessary SNMP information to external agents. For example, the SNMP 1485 may permit management of the system from a network management station running software, such as Hewlett-Packard's Network Node Manager ("HP-NNM"), through a framework, such as Hewlett-Packard's Open View. Accounting of packets (generally referred to as traffic statistics) may be performed by the control component 1410, thereby avoiding slowing traffic forwarding by the packet forwarding component 1490.

Although not shown, the example router 1400 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1460 via a console port, an auxiliary port, and/or a management Ethernet port.

The packet forwarding component 1490 is responsible for properly outputting received packets quickly. If there is no entry in the forwarding table for a given destination or a given label and the packet forwarding component 1490 cannot perform forwarding by itself, it 1490 may send the packets bound for that unknown destination off to the control component 1410 for processing. The example packet forwarding component 1490 is designed to perform Layer 2 and Layer 3 switching, route lookups, and rapid packet forwarding.

As shown in FIG. 14, the example packet forwarding component 1490 has an embedded microkernel 1492 over hardware components 1491, interface process(es) 1493, ASIC drivers 1494, and chassis process(es) 1495, and stores a forwarding (e.g., route-based and/or label-based) table(s) 1496. The microkernel 1492 interacts with the interface process(es) 1493 and the chassis process(es) 1495 to monitor and control these functions. The interface process(es) 1493 has direct communication with the OS kernel 1420 of the control component 1410. This communication includes forwarding exception packets and control packets to the control component 1410, receiving packets to be forwarded, receiving forwarding table updates, providing information about the health of the packet forwarding component 1490 to the control component 1410, and permitting configuration of the interfaces from the user interface (e.g., CLI) process(es) 1460 of the control component 1410. The stored forwarding table(s) 1496 is static until a new one is received from the control component 1410. The interface process(es) 1493 uses the forwarding table(s) 1496 to look up next-hop information. The interface process(es) 1493 also has direct communication with the distributed ASICs. Finally, the chassis process(es) 1495 may communicate directly with the microkernel 1492 and with the ASIC drivers 1494.

Figure 15:
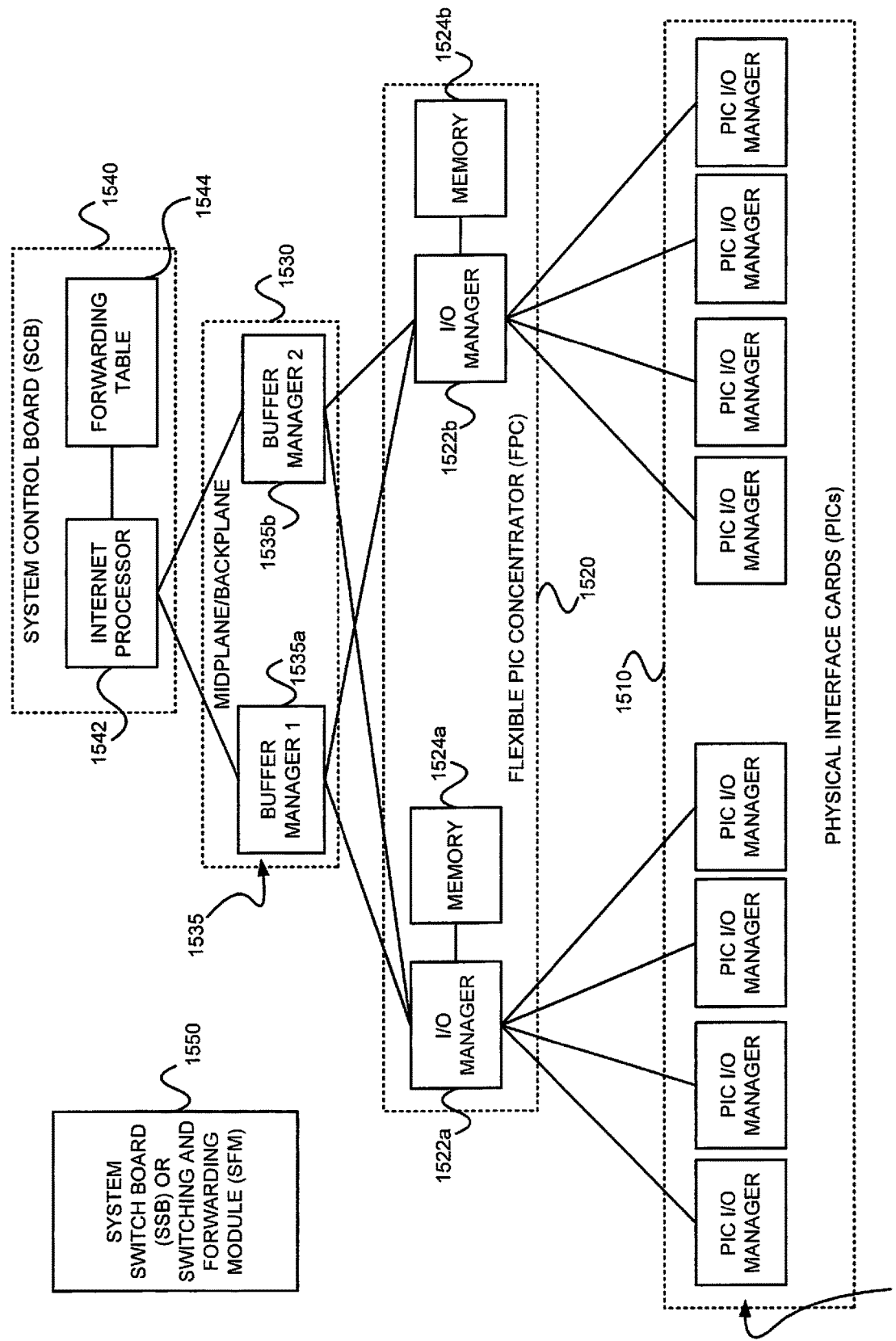
FIG. 15 is an example architecture in which ASICS may be distributed in a packet forwarding component to divide the responsibility of packet forwarding.

FIG. 15 is an example of how the ASICS may be distributed in the packet forwarding component 1490 to divide the responsibility of packet forwarding. As shown in FIG. 15, the ASICs of the packet forwarding component 1490 may be distributed on physical interface cards ("PICs") 1510, flexible PIC concentrators ("FPCs") 1520, a midplane or backplane 1530, and a system control board(s) 1540 (for switching and/or forwarding). Switching fabric is also shown as a system switch board ("SSB"), or a switching and forwarding module ("SFM") 1550 (which may be a switch fabric 1550' as shown in FIGS. 16A and 16B). Each of the PICs 1510 includes one or more PIC I/O managers 1515. Each of the FPCs 1520 includes one or more I/O managers 1522, each with an associated memory 1524 (which may be a RDRAM 1524' as shown in FIGS. 16A and 16B). The midplane/backplane 1530 includes buffer managers 1535*a*, 1535*b*. Finally, the system control board 1540 includes an internet processor 1542 and an instance of the forwarding table 1544 (Recall, e.g., 1496 of FIG. 14).

Still referring to FIG. 15, the PICs 1510 contain the interface ports. Each PIC 1510 may be plugged into an FPC 1520. Each individual PIC 1510 may contain an ASIC that handles media-specific functions, such as framing and/or encapsulation. Some example PICs 1510 provide SDH/SONET, ATM, Gigabit Ethernet, Fast Ethernet, and/or DS3/E3 interface ports.

An FPC 1520 can contain or be associated with one or more PICs 1510, and may carry the signals from the PICs 1510 to the midplane/backplane 1530 as shown in FIG. 15.

The midplane/backplane 1530 holds line cards. The line cards may connect into the midplane/backplane 1530 when inserted into the example router's chassis from the front. The control component (e.g., routing engine) 1410 may plug into the rear of the midplane/backplane 1530 from the rear of the chassis. The midplane/backplane 1530 may carry electrical (or optical) signals and power to each line card and to the control component 1410.

The system control board 1540 may perform forwarding lookup. It 1540 may also communicate errors to the routing engine. Further, it 1540 may also monitor the condition of the router based on information it receives from sensors. If an abnormal condition is detected, the system control board 1540 may immediately notify the control component 1410.

Referring to FIGS. 15, 16A and 16B, in some exemplary routers, each of the PICS 1510,1510' contains at least one I/O manager ASIC 1515 responsible for media-specific tasks, such as encapsulation. The packets pass through these I/O ASICs on their way into and out of the router. The I/O manager ASIC 1515 on the PIC 1510,1510' is responsible for managing the connection to the I/O manager ASIC 1522 on the FPC 1520,1520', managing link-layer framing and creating the bit stream, performing cyclical redundancy checks (CRCs), and detecting link layer errors and generating alarms, when appropriate. The FPC 1520 includes another I/O manager ASIC 1522. This ASIC 1522 (shown as a layer 2/layer 3 packet processing component 1510'/1520') takes the packets from the PICs 1510 and breaks them into (e.g., 74-byte) memory blocks. This FPC I/O manager ASIC 1522 (shown as a layer 2/layer 3 packet processing component 1510'/1520') sends the blocks to a first distributed buffer manager (DBM) 1535a (shown as switch interface component 1535a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 1535/1535a' manages and writes packets to the shared memory 1524 across all FPCs 1520. In parallel, the first DBM ASIC 1535/1535a' also extracts information on the destination of the packet and passes this forwarding-related information to the Internet processor 1542/1542'. The Internet processor 1542/1542' performs the route lookup using the forwarding table 1544 and sends the information over to a second DBM ASIC 1535b'. The Internet processor ASIC 1542/1542' also collects exception packets (i.e., those without a forwarding table entry) and sends them to the control component 1410. The second DBM ASIC 1535b (shown as a queuing and memory interface component 1535b') then takes this information and the 74-byte blocks and forwards them to the I/O manager ASIC 1522 of the egress FPC 1520/1520' (or multiple egress FPCs, in the case of multicast) for reassembly. (Thus, the DBM ASICs 1535a/1535a' and 1535b/1535b' are responsible for managing the packet memory 1524/1524' distributed across all FPCs 1520/1520', extracting forwarding-related information from packets, and instructing the FPC where to forward packets.)

The I/O manager ASIC 1522 on the egress FPC 1520/1520' may perform some value-added services. In addition to incrementing time to live ("TTL") values and re-encapsulating the packet for handling by the PIC 1510, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1522 on the egress FPC 1520/1520' may be responsible for receiving the blocks from the second DBM ASIC 1535/1535', incrementing TTL values, queuing a pointer to the packet, if necessary, before applying CoS rules, re-encapsulating the blocks, and sending the encapsulated packets to the PIC I/O manager ASIC 1515.

Figure 17:
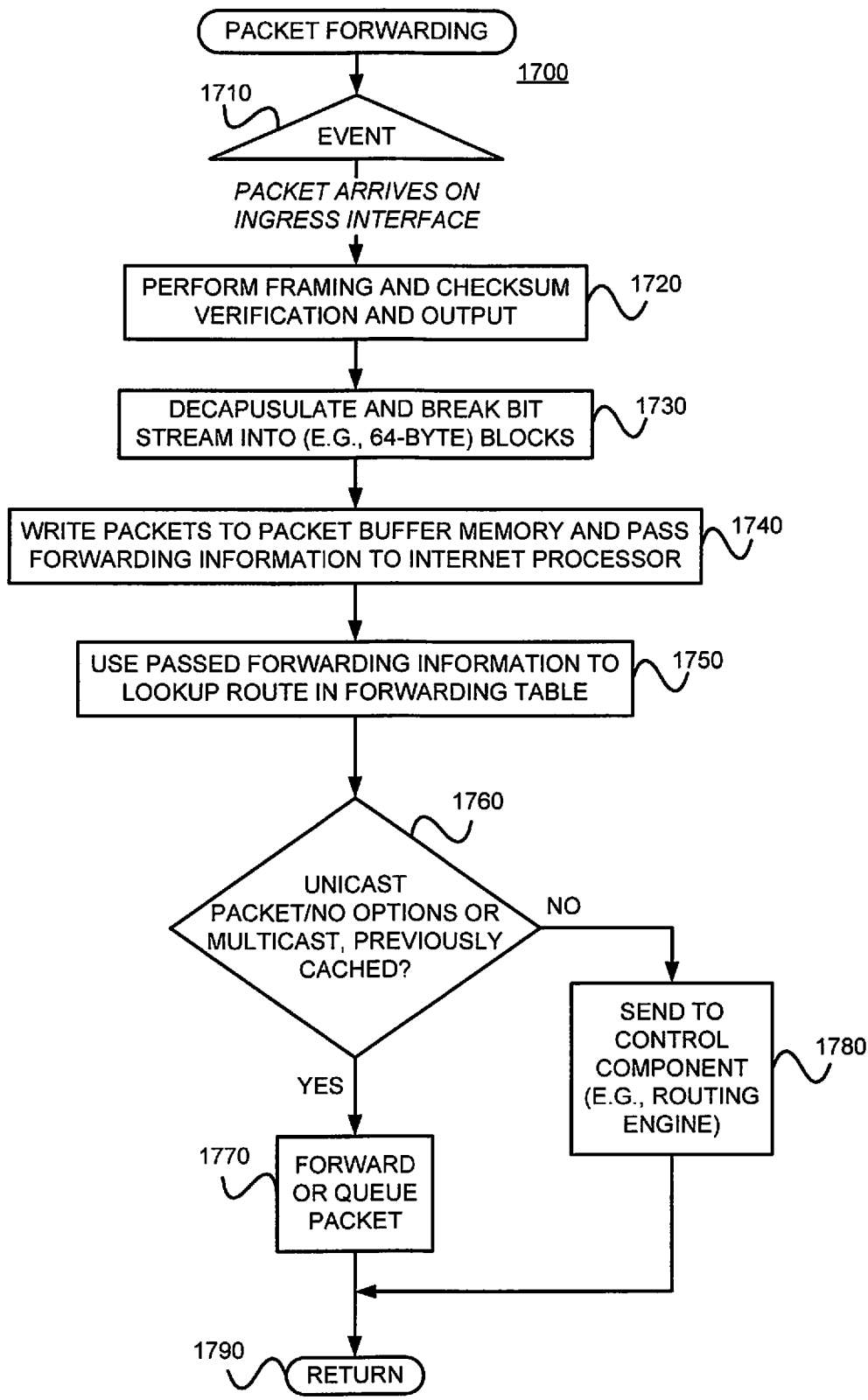
FIG. 17 is a flow diagram of an example method for providing packet forwarding in an example router.

FIG. 17 is a flow diagram of an example method 1700 for providing packet forwarding in the example router. The main acts of the method 1700 are triggered when a packet is received on an ingress (incoming) port or interface. (Event 1710) The types of checksum and frame checks that are required by the type of medium it serves are performed and the packet is output, as a serial bit stream. (Block 1720) The packet is then decapsulated and parsed into (e.g., 64-byte) blocks. (Block 1730) The packets are written to buffer memory and the forwarding information is passed on the Internet processor. (Block 1740) The passed forwarding information is then used to lookup a route in the forwarding table. (Block 1750) Note that the forwarding table can typically handle unicast packets that do not have options (e.g., accounting) set, and multicast packets for which it already has a cached entry. Thus, if it is determined that these conditions are met (YES branch of Decision 1760), the packet forwarding component finds the next hop and egress interface, and the packet is forwarded (or queued for forwarding) to the next hop via the egress interface (Block 1770) before the method 1700 is left (Node 1790) Otherwise, if these conditions are not met (NO branch of Decision 1760), the forwarding information is sent to the control component 1410 for advanced forwarding resolution (Block 1780) before the method 1700 is left (Node 1790).

Referring back to block 1770, the packet may be queued. Actually, as stated earlier with reference to FIG. 15, a pointer to the packet may be queued; the packet itself may remain in the shared memory. Thus, all queuing decisions and CoS rules may be applied in the absence of the actual packet. When the pointer for the packet reaches the front of the line, the I/O manager ASIC 1522 may send a request for the packet to the second DBM ASIC 1535b. The DBM ASIC 1535 reads the blocks from shared memory and sends them to the I/O manager ASIC 1522 on the FPC 1520, which then serializes the bits and sends them to the media-specific ASIC of the egress interface. The I/O manager ASIC 1515 on the egress PIC 1510 may apply the physical-layer framing, perform the CRC, and send the bit stream out over the link.

Referring back to block 1780 of FIG. 17, as well as FIG. 15, regarding the transfer of control and exception packets, the system control board 1540 handles nearly all exception packets. For example, the system control board 1540 may pass exception packets to the control component 1410.

Although example embodiments consistent with the present description may be implemented on the example routers of FIG. 13 or 14, embodiments consistent with the present description may be implemented on communications network nodes (e.g., routers, switches, etc.) having different architectures. More generally, embodiments consistent with the present description may be implemented on an example system 1800 as illustrated on FIG. 18.

Figure 18:
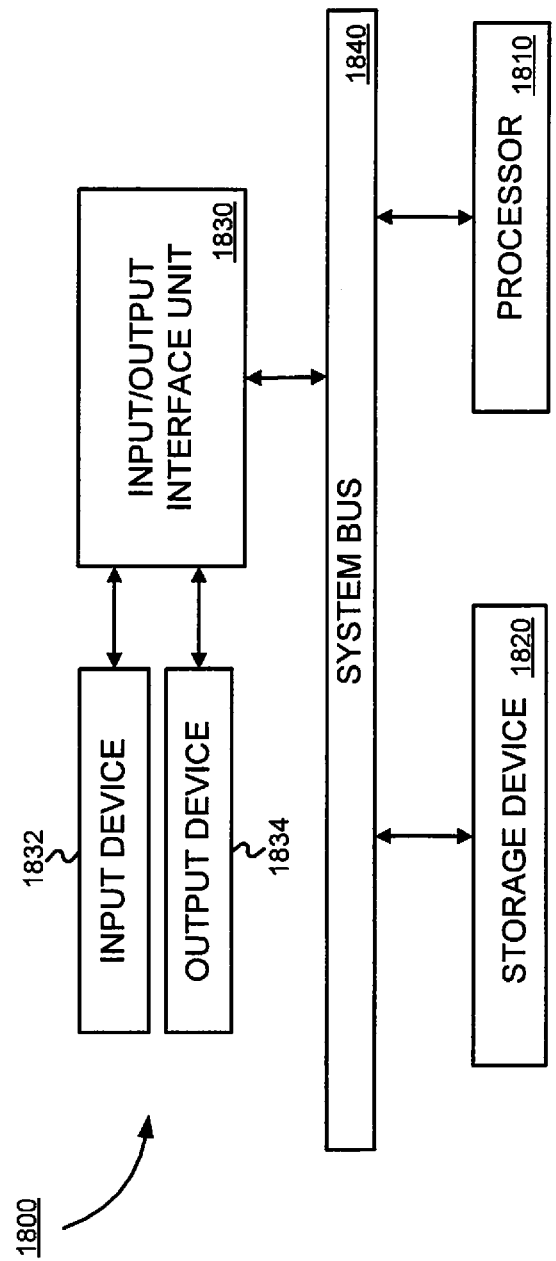
FIG. 18 is a block diagram of an exemplary machine that may perform one or more of the processes or methods described, and/or store information used and/or generated by such processes or methods.

FIG. 18 is a block diagram of an exemplary machine 1800 that may perform one or more of the processes or methods described, and/or store information used and/or generated by such processes or methods. The exemplary machine 1800 includes one or more processors 1810, one or more input/output interface units 1830, one or more storage devices 1820, and one or more system buses and/or networks 1840 for facilitating the communication of information among the coupled elements. One or more input devices 1832 and one or more output devices 1834 may be coupled with the one or more input/output interfaces 1830. The one or more processors 1810 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1820 and/or may be received from an external source via one or more input interface units 1830. The machine executable instructions may be stored as various software modules, each module performing one or more operations. Functional software modules are examples of components of the present description.

In some embodiments consistent with the present description, the processors 1810 may be one or more microprocessors and/or ASICs. The bus 1840 may include a system bus. The storage devices 1820 may include system memory, such as read only memory (ROM) and/or random access memory (RAM). The storage devices 1820 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

What is claimed is:

1. For use in a system including an Ethernet Virtual Private Network (EVPN) core network and a virtual extensible local area network (VXLAN) data plane, a first gateway device (GW1) and a second gateway device (GW2) operating in an all-active multihoming mode to interconnect the EVPN core network and VXLAN data plane, a computer-implemented method comprising:

establishing, by the second gateway device GW2, operating with the first gateway device GW1 in an all-active multihoming mode to interconnect the EVPN core network and the VXLAN dataplane, a VXLAN tunnel to a remote VXLAN tunnel end point (VTEP) X in the VXLAN before traffic is sent by the remote VTEP X and received by the second gateway device GW2, but after traffic is sent by the remote VTEP X and received by the first gateway device GW1, by:

proactively forcing, by the second gateway device GW2, the remote VTEP X to send an address resolution protocol (ARP) packet from an attached host, to the second gateway device GW2; and establishing, by the second gateway device GW2 and responsive to receiving the ARP packet, a VXLAN tunnel from the second gateway device GW2 to the remote VTEP X, wherein the first and second gateway devices GW1 and GW2 use an anycast Internet protocol (IP) address as a source address for VTEP X.

2. The method of claim 1, wherein the act of proactively forcing, by the second gateway device GW2, the remote VTEP X to send an ARP packet from an attached host, to the second gateway device GW2, includes:

receiving, by the second gateway device GW2, a type-2 route for a media access control (MAC) and IP address of host A, including an Ethernet Segment Identifier (ESI), from the first gateway device GW1;

learning, by the second gateway device GW2, a multihomed Ethernet Segment Identifier (ESI) and a bridge domain of host A from the type-2 route;

determining, by the second gateway device GW2, and based on the multihoming ESI associated with the type-2 route, that host A is behind the VXLAN data plane network instead of a regular customer edge (CE) device; and flooding, by the second gateway device GW2, an ARP request to a plurality of remote VTEPs on the VXLAN, including VTEP X.

3. The method of claim 1, wherein the act of proactively forcing, by the second gateway device GW2, the remote VTEP X to send an ARP packet from an attached host, to the second gateway device GW2, includes:

receiving, by the second gateway device GW2, a type-2 route for a MAC address and an IP address (MAC/IP) of host A, including an Ethernet Segment Identifier (ESI), from the first gateway device GW1;

checking, by the second gateway device GW2, whether the MAC/IP is associated with an established data plane VXLAN tunnel; and responsive to a determination by the second gateway device GW2 that the second gateway device GW2 cannot find an established data plane VXLAN tunnel associated with the MAC/IP, 1) generating, by the second gateway device GW2, a host generated ARP request packet for host A's IP address received in the type-2 route, wherein an outer IP header of the host-generated ARP packet has a unique lookback address of the second gateway device GW2 as the source IP address and a multicast group for the bridge domain as a destination IP address, and wherein an inner ARP request packet has a source IP/MAC set to GW2's integrated routing and bridging's (IRB's) unique MAC/IP address, and 2) delivering the host-generated ARP request to host A through an underlay PIM to all remote VTEPs of the VXLAN.

4. The method of claim 2, wherein the host-generated ARP request triggers data plane learning at the remote VTEPs of the VXLAN.

5. The method of claim 4, wherein the remote VTEP X learns the unique loopback address of the second gateway device GW2 and establishes a VXLAN tunnel to the second gateway device GW2 if it had not already done so.

6. The method of claim 5, wherein the remote VTEP X also learns GW2's IRB's MAC/IP is behind its VXLAN tunnel to GW2, whereby, when a unicast ARP reply comes back from host A, this time the remote VTEP X sends the unicast ARP reply to the second gateway device GW2 directly such that the second gateway device GW2 has forced the remote VTEP X to send a data packet to it.

7. The method of claim 6, further comprising:

updating, by the second gateway device GW2, a forwarding entry for host A's MAC, whereby it becomes unnecessary for the gateway device GW2 to flood traffic destinated to host A and whereby blackholing is avoided by any non-designated forwarder gateway device;

receiving, by the second gateway device GW2, unicast traffic to host A; and forwarding the unicast traffic to host A using the forwarding entry, without flooding and without traffic blackholing.

8. For use in a system including an Ethernet Virtual Private Network (EVPN) core network and a virtual extensible local area network (VXLAN) data plane, a second gateway device (GW2) which, together with a first gateway device (GW1), operates in an all-active multihoming mode to interconnect the EVPN core network and VXLAN data plane, the second gateway device comprising:

at least one processor; and a storage device storing processor-executable instructions which, when executed by the at least one processor, cause the at least one processor to establish, by the second gateway device GW2, operating with the first gateway device GW1 in an all-active multihoming mode to interconnect the EVPN core network and the VXLAN dataplane, a VXLAN tunnel to a remote VXLAN tunnel end point (VTEP) X of the VXLAN before traffic is sent by the remote VTEP X and received by the second gateway device GW2, but after traffic is sent by the remote VTEP X and received by the first gateway device GW1, by:

proactively forcing, by the second gateway device GW2, the remote VTEP X to send an address resolution protocol (ARP) packet from an attached host, to the second gateway device GW2; and establishing, by the second gateway device GW2 and responsive to receiving the packet, a VXLAN tunnel from the second gateway device GW2 to the remote VTEP X, wherein the first and second gateway devices GW1 and GW2 use an anycast address as a source address for VTEP X.

9. A non-transitory computer-readable storage medium storing processor-executable instructions which, when executed by at least one processor, cause the at least one processor to perform a method for use in a system including an Ethernet Virtual Private Network (EVPN) core network and a VXLAN data plane, a first gateway device GW1 and a second gateway device GW2 operating in an all-active multihoming mode to interconnect the EVPN core network and VXLAN data plane, the method comprising:

establishing, by the second gateway device GW2, operating with the first gateway device GW1 in an all-active multihoming mode to interconnect the EVPN core network and the VXLAN dataplane, a VXLAN tunnel to a remote VTEP X in the VXLAN before traffic is sent by the remote VTEP X and received by the second gateway device GW2, but after traffic is sent by the remote VTEP X and received by the first gateway device GW1, by:

proactively forcing, by the second gateway device GW2, the remote VTEP X to send an address resolution protocol (ARP) packet from an attached host, to the second gateway device GW2; and establishing, by the second gateway device GW2 and responsive to receiving the packet, a VXLAN tunnel from the second gateway device GW2 to the remote VTEP X, wherein the first and second gateway devices GW1 and GW2 use an anycast address as a source address for VTEP X.

10. The second gateway device of claim 8, wherein the act of proactively forcing, by the second gateway device GW2, the remote VTEP X to send an address resolution protocol (ARP) packet from an attached host, to the second gateway device GW2, includes:

receiving, by the second gateway device GW2, a type-2 route for a media access control (MAC) and IP address (MAC/IP) of host A, including an Ethernet Segment Identifier (ESI), from the first gateway device GW1;

learning, by the second gateway device GW2, a multihomed Ethernet Segment Identifier (ESI) and a bridge domain of host A from the type-2 route;

determining, by the second gateway device GW2, and based on the multihoming ESI associated with the type-2 route, that host A is behind the VXLAN data plane network instead of a regular customer edge (CE) device; and flooding, by the second gateway device GW2, an ARP request to a plurality of remote VTEPs on the VXLAN, including VTEP X.

11. The second gateway device of claim 10, wherein the host-generated ARP request triggers data plane learning at the remote VTEPs of the VXLAN.

12. The second gateway of claim 11, wherein the remote VTEP X learns the unique loopback address of the second gateway device GW2 and establishes a VXLAN tunnel to the second gateway device GW2 if it had not already done so.

13. The second gateway of claim 12, wherein the remote VTEP X also learns GW2's IRB's MAC/IP is behind its VXLAN tunnel to GW2, whereby, when a unicast ARP reply comes back from host A, this time the remote VTEP X sends the unicast ARP reply to the second gateway device GW2 directly such that the second gateway device GW2 has forced the remote VTEP X to send a data packet to it.

14. The second gateway of claim 13, wherein the processor-executable instructions which, when executed by the at least one processor, further cause the at least one processor to:

update, by the second gateway device GW2, a forwarding entry for host A's MAC, whereby it becomes unnecessary for the gateway device GW2 to flood traffic destinated to host A and whereby blackholing is avoided by any non-designated forwarder gateway device;

receive, by the second gateway device GW2, unicast traffic to host A; and forward the unicast traffic to host A using the forwarding entry, without flooding and without traffic blackholing.

15. The second gateway device of claim 8, wherein the act of proactively forcing, by the second gateway device GW2, the remote VTEP X to send an address resolution protocol (ARP) packet from an attached host, to the second gateway device GW2, includes:

receiving, by the second gateway device GW2, a type-2 route for a MAC address and an IP address of host A, including an Ethernet Segment Identifier (ESI), from the first gateway device GW1;

checking, by the second gateway device GW2, whether the MAC/IP is associated with an established data plane VXLAN tunnel; and responsive to a determination by the second gateway device GW2 that the second gateway device GW2 cannot find an established data plane VXLAN tunnel associated with the media access control/Internet protocol (MAC/IP), 1) generating, by the second gateway device GW2, a host generated ARP request packet for host A's IP address received in the type-2 route, wherein an outer IP header of the host-generated ARP packet has a unique lookback address of the second gateway device GW2 as the source IP address and a multicast group for the bridge domain as a destination IP address, and wherein an inner ARP request packet has a source IP/MAC set to GW2's integrated routing and bridging's (IRB's) unique MAC/IP address, and 2) delivering the host-generated ARP request to host A through an underlay PIM to all remote VTEPs of the VXLAN.

16. The non-transitory computer-readable medium of claim 9, wherein the host-generated ARP request triggers data plane learning at the remote VTEPs of the VXLAN.

17. The non-transitory computer-readable medium of claim 16, wherein the remote VTEP X learns the unique loopback address of the second gateway device GW2 and establishes a VXLAN tunnel to the second gateway device GW2 if it had not already done so.

18. The non-transitory computer-readable medium of claim 17, wherein the remote VTEP X also learns GW2's IRB's MAC/IP is behind its VXLAN tunnel to GW2, whereby, when a unicast ARP reply comes back from host A, this time the remote VTEP X sends the unicast ARP reply to the second gateway device GW2 directly such that the second gateway device GW2 has forced the remote VTEP X to send a data packet to it.

19. The non-transitory computer-readable medium of claim 18, wherein the processor-executable instructions which, when executed by the at least one processor, further cause the at least one processor to:

update, by the second gateway device GW2, a forwarding entry for host A's MAC, whereby it becomes unnecessary for the gateway device GW2 to flood traffic destinated to host A and whereby blackholing is avoided by any non-designated forwarder gateway device;

receive, by the second gateway device GW2, unicast traffic to host A; and forward the unicast traffic to host A using the forwarding entry, without flooding and without traffic blackholing.

20. The non-transitory computer-readable medium of claim 19, wherein the act of proactively forcing, by the second gateway device GW2, the remote VTEP X to send an address resolution protocol (ARP) packet from an attached host, to the second gateway device GW2, includes:

receiving, by the second gateway device GW2, a type-2 route for a MAC address and an IP address of host A, including an Ethernet Segment Identifier (ESI), from the first gateway device GW1;

checking, by the second gateway device GW2, whether the MAC/IP is associated with an established data plane VXLAN tunnel; and responsive to a determination by the second gateway device GW2 that the second gateway device GW2 cannot find an established data plane VXLAN tunnel associated with the media access control/Internet protocol (MAC/IP), 1) generating, by the second gateway device GW2, a host generated ARP request packet for host A's IP address received in the type-2 route, wherein an outer IP header of the host-generated ARP packet has a unique lookback address of the second gateway device GW2 as the source IP address and a multicast group for the bridge domain as a destination IP address, and wherein an inner ARP request packet has a source IP/MAC set to GW2's integrated routing and bridging's (IRB's) unique MAC/IP address, and 2) delivering the host-generated ARP request to host A through an underlay PIM to all remote VTEPs of the VXLAN.

* * * * *